(12) United States Patent
Balachandran et al.

(10) Patent No.: US 6,901,176 B2
(45) Date of Patent: May 31, 2005

(54) FIBER TIP BASED SENSOR SYSTEM FOR ACOUSTIC MEASUREMENTS

(75) Inventors: Balakumar Balachandran, Rockville, MD (US); Miao Yu, Beltsville, MD (US); Moustafa Al-Bassyiouni, Greenbelt, MD (US)

(73) Assignee: University of Maryland, Riverdale, MD (US)

( * ) Notice: Subject to any disclaimer, the term of this patent is extended or adjusted under 35 U.S.C. 154(b) by 180 days.

(21) Appl. No.: 10/270,277

(22) Filed: Oct. 15, 2002

(65) Prior Publication Data

US 2004/0071383 A1 Apr. 15, 2004

(51) Int. Cl.[7] .................................................. G01B 9/02

(52) U.S. Cl. .................... 385/12; 356/482; 356/345; 356/358; 356/363

(58) Field of Search .......................... 385/12; 356/482, 356/345, 358, 363

(56) References Cited

U.S. PATENT DOCUMENTS

| | | | |
|---|---|---|---|
| 5,392,117 A | | 2/1995 | Belleville et al. |
| 5,459,571 A | * | 10/1995 | Dammann et al. ........... 356/482 |
| 6,281,976 B1 | * | 8/2001 | Taylor et al. ................ 356/480 |
| 2003/0169956 A1 | * | 9/2003 | Lange et al. |

OTHER PUBLICATIONS

A. Sampath, et al, "Active control of multiple tones transmitted in an enclosure", *Journal of the Acoustical Society of America*, vol. 106, No. 1, pp. 211–225. Jul. 1999.

M. Al-Bassyiouni, et al., "Zero Spillover Control of Enclosed Sound Fields", *SPIE's 8th Annual International Symposium on Smart Structures and Materials*, Mar. 2001, vol. 4362, Paper No. 4326–7.

M. Al-Bassyiouni, et al., "Experimental Studies of Zero Spillover Scheme for Active Structural Acoustic Control Systems", *Proceedings of the 12th International Conference on Adaptive Structures and Technologies (ICAST)*, Oct. 2001.

B. Balachandran, et al., "Actuator Nonlinearities in Interior Acoustics Control", *Proceedings of the SPIE's 7th Annual International Symposium on Smart Structures and Materials*, Mar. 2000, vol. 3984, Paper No. 3984–13.

J.A. Bucaro, et al., "Fiber Optic Hydrophone", *Journal of the Acoustical Society of America*, vol. 62, No. 5, pp. 1302–1304, 1977.

(Continued)

*Primary Examiner*—John R. Lee
*Assistant Examiner*—Zia R. Hashmi
(74) *Attorney, Agent, or Firm*—Rosenberg, Klein & Lee

(57) ABSTRACT

A fiber optic sensor system for acoustic measurements over a 6 kHz bandwidth, the design of which allows for multiplexity of the input side of the system, and where the optical part of the system is based on low coherence fiber-optic interferometry techniques which has a sensor Fabry-Perot interferometer and a read-out interferometer as well, that allows a high dynamic range and low sensitivity to the wavelength fluctuation of the light source, as well as the optical intensity fluctuations. A phase modulation and demodulation scheme takes advantage of the Integrated Optical Circuit phase modulator and multi-step phase-stepping algorithm for providing for high frequency and real time phase signal demodulation. The system includes fiber tip based Fabry-Perot sensors which have a diaphragm, which is used as the transducer. Pressure microphone, velocity sensor, as well as accelerometer, are built based on the fiber tip based Fabry-Perot sensors.

24 Claims, 27 Drawing Sheets

OTHER PUBLICATIONS

J.H. Cole, et al., "Fiber Optic Detection of Sound", *Journal of the Acoustical Society of America,* vol. 62, No. 5, pp. 1136–1138, 1977.

C.F. Hess, "Optical Microphone for the Detection of Hidden Helicopters", *AIAA Journal,* vol. 30, No. 11, pp. 2626–2631, Nov. 1992.

G. He, et al., "The Analysis of Noises in a Fiber Optic Microphone", *Journal of the Acoustical Society of America,* vol. 92, No. 5, pp. 2521–2526, Nov. 1992.

C.H. Zhou, et al., "Fiberoptic Microphone based on a Combination of Fabry—Perot Interferometry and Intensity Modulation", *Journal of the Acoustical Society of America,* vol. 98, No. 2, pp. 1042–1046, Aug. 1995.

D.L. Li, et al., "The Ring–Type All–Fiber Fabry–Perot Interferometer Hydrophone System", *Journal of the Acoustical Society of America,* vol. 104, No. 5, pp. 2798–2806, 1998.

C. Koch, "Measurement of Ultrasonic Pressure by Heterodyne Interferometry with a Finger–Tip Sensor", *Applied Optics,* vol. 36, No. 13, 1999.

P.C. Beard, et al., "Characterization of a Polymer Film Optical Fiber Hydrophone for Use in the Range 1 to 20 MHZ: A Comparison with PVDF Needle and Membrane Hydrophones", *IEEE Transactions on Ultrasonics, Ferroelectrics, and Frequency Control,* vol. 47, No. 1, pp. 256–265, 2000.

C. Baldwin, et al., "Bragg Grating Based Fabry–Perot Sensor System for Acoustic Measurements", *Proceedings of the SPIE Symposium on Smart Structures and Materials,* vol. 3670, pp. 342–351, Mar. 1999.

M. Yu, et al., "Fiber Tip Based Fiber Optic Acoustic Sensors", *Proceedings of the 12th International Conference on Adaptive Structures and Technologies (ICAST),* Oct. 2001.

L.E. Kinsler, et al., "Fundamentals of Acoustics", Fourth Edition, Chap. 14, Section 14.11, John Wiley & Sons, Inc., 2000.

J.W. Parkins, "Active Minimization of Energy Density in a Three–Dimensional Enclosure", Ph.D. Dissertation, Pennsylvania State University, 1998.

\* cited by examiner

SENSOR INTERFEROMETER: FABRY-PEROT SENSOR

REFERENCE INTERFEROMETER: MACH-ZEHNDER INTERFEROMETER

WHEN PATH MATCHED : $L_s = L_r$

FIBER TIP BASED SENSOR SYSTEM FOR ACOUSTIC MEASUREMENTS

STATEMENT REGARDING FEDERALLY SPONSORED RESEARCH OR DEVELOPMENT

This invention was made with government support under Contract Number DAAH04-96-1-0334 awarded by the U.S. Army Research Office and Contract Number CMS23222 awarded by the National Science Foundation. The government has certain rights in the invention.

FIELD OF THE INVENTION

The present invention relates to acoustic measurement and more in particular, to fiber tip based fiber optic acoustic sensors for measurement of acoustic fields in the frequency range of 50 Hz to 7.5 kHz.

Even more in particular, the present invention relates to fiber tip based low-finesse Fabry-Perot sensors system for acoustic pressure, velocity and acceleration measurements, designed to work in an acoustic control system with multiple sensor inputs.

Further, the present invention relates to a fiber tip based Fabry-Perot sensor system for detection of the acoustically induced optical phase shift by using an interference technique where non-linear output characteristics of the sensors are demodulated to decode the optical intensity signals into optical phase signals.

The present invention also relates to a fiber tip type sensor system for acoustic measurements using a PC type pseudo-heterodyne scheme based on a multi-step phase stepping algorithm where the optical signal is modulated by an Integrated Optical Circuit phase modulator.

In addition, the present invention relates to a fiber optic sensor system for active acoustics control permitting sensor re-configuration which may be used as a fiber based microphone, velocity sensor, and acceleration sensor.

BACKGROUND OF THE INVENTION

In the design of modern transportation vehicles, structural vibration and interior noise have become important problems that need to be addressed. For example, in helicopter systems control of sound transmission into enclosed spaces is an important issue. Various studies have shown that the predominant frequency components associated with the noise transmission lie in the frequency range of 50 Hz to 5500 Hz. There are various approaches that may be used to control sound field inside a helicopter cabin.

Among the different approaches, one is based on controlling the radiation (transmission) from (through) a flexible structure by active means which is referred to as Active Structural Acoustic Control (ASAC). The ASAC scheme is an effective solution for low frequency applications which takes advantage of vibrating structural elements as secondary noise sources to cancel the sound fields generated by a primary noise source (A. Sampath, et al., "Active Control of Multiple Tones Transmitted in an Enclosure", Journal of the Acoustical Society of America, Vol. 106, No. 1, Pages 211–225, July 1999; M. Al-Bassyiouni, et al., "Zero Spillover Control of Enclosed Sound Fields", SPIE's Annual International Symposium of Smart Structures and Materials, Newport Beach, Calif., March 4–8, Vol. 4362, Paper No. 4326-7, 2001; and, M. Al-Bassyiouni, et al., "Experimental Studies of Zero Spillover Scheme for Active Structural Acoustic Control Systems", Proceedings of the 12$^{th}$ International Conference on Adaptive Structures and Technologies (ICAST), University of Maryland, College Park, Md., Oct. 15–17, 2001). It appears that ASAC schemes require much less dimensionality than Active Noise Control (ANC) schemes in order to realize widely distributed spatial noise reduction. However, active research is still being pursued to address issues such as sensors, actuators, and control architecture.

Fiber-optic sensors have the advantages of being lightweight, having high sensitivity, and simplicity in multiplexing. Since the original demonstrations showed that optical fibers could be used as acoustic sensors (Bucaro J. A., et al., "Fiber Optic Hydrophone", Journal of Acoustical Society of America, 62, Pages 1302–1304, 1977; and, Cole, J. H., et al., "Fiber Optic Detection of Sound", Journal of Acoustic Society of America, 62, Pages 1136–1138, 1977), substantial research has been ongoing in this field. Much of this effort has been directed towards the development of hydrophones for ultrasonic detection which does not suit the needs for an ASAC system.

Since Bragg grating sensors were shown to be multiplexed by using Wavelength Division Multiplexing (WDM) techniques, Baldwin, et al., ("Bragg Grating Based Fabry-Perot Sensor System for Acoustic Measurements", Proceedings of the SPIE 1999 Symposium on Smart Structures and Materials, Newport Beach, Calif., Mar. 1–5, 1999), developed a Bragg grating based Fabry-Perot sensor system for use in ASAC schemes. However, the sensor bandwidth was found to be limited and in addition, the sensor was found to have low sensitivity due to the high Young's modules of silica resulting in "acoustically induced strains" which also limit the application of these types of sensors.

Hence, low finesse Fabry-Perot sensors have become attractive choices for high performance sensing in this area. For example, a Fabry-Perot optical sensing device for measuring a physical parameter, described in U.S. Pat. No. 5,392,117, comprises a Fabry-Perot interferometer through which a multiple frequency light signal having predetermined spectral characteristics is passed. The system further includes an optical focusing device for focusing at least a portion of the light signal outgoing from the Fabry-Perot interferometer and a Fizeau interferometer through which the focused light signal is passed.

The Fabry-Perot interferometer includes two semi-reflecting mirrors substantially parallel to one another and spaced apart so as to define a Fabry-Perot cavity having transmittance or reflectance properties which are effected by a physical parameter such as pressure, temperature, refractive index of a liquid, etc., and which causes the spectral properties of the light signal to vary in response to the changes in physical parameters.

The Fabry-Perot interferometer is provided with at least one optical fiber for transmitting the light signal into the Fabry-Perot cavity and for collecting the portion of the light signal being transmitted outwardly. The Fizeau interferometer includes an optical wedge forming a wedge-profile Fizeau cavity from which exits a spatially-spread light signal indicative of the transmittance or reflectance properties of the Fabry-Perot interferometer.

The physical parameters can be determined by means of the spatially-spread light signal. It is however clear that in the sensing device of '117 Patent, the Fabry-Perot interferometer is a read-out interferometer rather than a sensor interferometer which is a Fizeau interferometer.

There are two types of modulation schemes used in fiber optical sensing systems to recover a signal, one being an intensity modulation scheme and the other being a phase modulation scheme. Intensity modulated sensors offer simplicity of design and ease of implementation, however they suffer from problems of limited sensitivity, low dynamic range and drift, due to uncertainty fluctuation. While phase modulated sensors are based on detection of the acoustically induced optical phase shift by using an interference technique. They have high sensitivity and don't suffer from optical source and receiver drift problems, however their non-linear input/output characteristics require careful demodulation design.

It is therefore clear that a sensor system for acoustic pressure measurements in a wide frequency range (50 Hz to 5.5–7.5 kHz) using thoroughly designed digital phase demodulation techniques is still needed in the field. In addition, as part of the ASAC scheme, other sensor configurations, which may be used for measuring sound pressure gradients, velocity and acceleration, are still of essential interest.

Velocity sensors have numerous advantages, some of which are as follows: (1) sensitivity to spherical waves than pressure microphone; (2) may be used along with the pressure microphones to measure the sound energy density, and (3) may be used along with pressure microphones to develop a unidirectional microphone which would favor waves incident from only one direction and discriminate from waves incident from other directions.

The concept of a typical velocity microphone is known in the prior art. However, complexity and bulkiness of known velocity microphones makes them difficult to use effectively in ASAC systems. A conventional arrangement of a velocity microphone consists of a corrugated metallic ribbon suspended between magnetic pole pieces N and S and freely acceptable to acoustic pressures on both sides (L. E. Kinsler, et al., "Fundamentals of Acoustics", Second Edition, John Wiley & Sons, Inc., New York, 1962).

The ribbon acts as a short light cylinder that may be easily displaced in one direction under a force generated by air pressure. A velocity sensor was proposed (J. W. Parkins, "Active Minimization of Energy Density in a Three-Dimensional Enclosure", Ph.D. Dissertation, Pennsylvania State University, 1998) which consists of six pressure condensor microphones mounted on a sphere of radius of 2.0 inches.

A finite difference scheme was used to predict the air particle velocity from the pressure measurement. Although the size of the sensor was "small" compared to many commercially available velocity probes, it was shown that such a sensor could lead to errors if there is any mismatching between the different pressure microphones.

There is also the potential for interference, since the microphones are housed together in a small volume. This interference may significantly affect the sensor signal-to-noise ratio, especially at low sound pressure levels. It is thus clear that a velocity sensor free of disadvantages of prior art velocity sensors is still needed in the industry.

As part of ASAC systems as well as for Active Vibration Control (AVC), acceleration sensors of high sensitivity and low mass can also contribute to overall control of structural vibration and interior noise. The conventional accelerometer consists mainly of a uniform cantilever beam fixed to the accelerometer housing and which is attached to a structure, the parameters of which are to be detected and measured. As the accelerometer vibrates due to base excitation, the cantilever tip oscillates about the undeformed axis, and the deflection at any point along the undeformed axis of the beam is a function of the excitation acceleration. It would be desirable to apply principles of the fiber tip based Fabry-Perot sensor to measurements of such a deflection of the oscillating beam.

Summarizing the discussion of the prior art supra, it is readily understood to those skilled in the art that it is still a long-lasting need in the field of active structural acoustical control to provide a wide bandwidth (in the frequency range of 50 Hz to 7.5 KHz) fiber tip based Fabry-Perot sensor systems for acoustic measurements with an extensively designed digital phase demodulation technique, free of disadvantages of the prior art acoustical measurement systems, and which would be capable of serving as microphone, velocity sensor, and acceleration sensor.

SUMMARY OF THE INVENTION

It is an object of the present invention to provide a fiber tip based Fabry-Perot sensor system for acoustic measurements which may be used to detect acoustic fields in the frequency range of 50 Hz to 7.5 KHz.

It is another object of the present invention to provide fiber tip based Fabry-Perot sensor systems for active acoustic control where fiber tip sensors are designed for acoustic pressure and air particle velocity measurements internal/external to an enclosure, and further to provide acceleration measurements.

Another object of the present invention is to provide a multi-sensor fiber tip based active acoustic control system in which a digital phase demodulation system is based on a multi-step phase-stepping technique to decode the optical intensity signal into optical phase signals.

According to the teachings of the present invention, a fiber optic sensor system for acoustic measurements includes a pressure sensor, a velocity sensor, and an accelerometer sensor, and combinations thereof. The pressure sensor and the velocity sensor include a plurality of substantially identical sensors, where each sensor includes a diaphragm and a fiber tip based sensing interferometer having a Fabry-Perot cavity formed between the fiber tip and the diaphragm. In the velocity sensor arrangement, a plurality of the sensors are arranged in pairs with each pair of sensors positioned normal with respect to an axis of another pair of the sensors.

In the accelerometer sensor arrangement, the accelerometer includes a cantilever beam deflectable under excitation and one of the plurality of sensors coupled to the cantilever beam.

Although several patterns of networking the multiplicity of fiber based Fabry-Perot sensors is contemplated within the scope of the present invention, in one such arrangement an optical switch is coupled in the circuitry to be connected to the plurality of fiber tip based Fabry-Perot sensors for multiplexing.

The fiber optic sensor system further includes a light source which may be in the form of a superluminescent light emitting diode array, an integrated optical circuit (IOC) phase modulator coupled to the light source to modulate the light generated from the light source, a read-out interferometer built-in the IOC phase modulator where the read-out interferometer is path-matched to the sensing interferometer of each of the plurality of the sensors, and a plurality of photodetectors. Each of the photodetectors are coupled to a respective one of the plurality of sensors. The outputs of the photodetectors are connected to data acquisition means which may include a 12-bit National Instruments Digital Acquisition Board capable of being triggered to record the intensity (output of each photodetector) every $\pi/2$ radians of the modulation signal.

Phase modulation-demodulation mechanisms are coupled to the IOC phase modulator and the plurality of the photodetectors for modulating the light beam in the IOC phase modulator in accordance with a multi-step phase-stepping pattern. Demodulation data is obtained from the plurality of the photodetectors in synchronism with the multi-step phase-stepping modulation pattern.

The modulation signal is a discrete sawtooth wave generated from the digital-to-analog output of the personal computer. In every period of the modulation signal, four digital voltages are generated and used to drive four step modulated phase values from the IOC phase modulator based on the calibration curve. The modulated phases then are added to the sensor phase change. The combined phase signal is detected by the high speed photodetector and sent to the analog-to-digital input of a personal computer.

On the demodulation side of the phase modulation-demodulation means, the optical intensity output from the photodetectors is sampled four times during each period of the modulation signal. The data acquisition means records the intensity every $\pi/2$ radians of the modulation signal. When the depth of modulation is set to $3\pi/2$ and the sampling rate is synchronized with the modulation frequency, the four consecutive optical intensity measurement yields the following:

$$I_0 = A + B \cos(\Delta\phi_s + 0) = A + B \cos(\Delta\phi_s),$$

$$I_1 = A + B\cos\left(\Delta\phi_s + \frac{\pi}{2}\right) = A - B\sin(\Delta\phi_s),$$

$$I_2 = A + B \cos(\Delta\phi_s + \pi) = A - B \cos(\Delta\phi_s),$$

$$I_3 = A + B\cos\left(\Delta\phi_s + \frac{3\pi}{2}\right) = A + B\sin(\Delta\phi_s).$$

The sensor phase is then determined by the processor from these four intensity values by using the following arc-tangent function:

$$\Delta\phi_s = \tan^{-1}\left(\frac{I_3 - I_1}{I_0 - I_2}\right)$$

The pressure of the acoustic excitation is determined based on such obtained sensor phase.

Preferably, the read-out interferometer is a Mach-Zehnder interferometer. All connections between the fiber tip based Fabry-Perot sensors, photodetectors, and the IOC phase modulator are through optical couplers.

In each sensor, a $TiO_2$ film coats the fiber tip to make a partial mirror for the Fabry-Perot cavity of the sensing interferometer.

The diaphragm is made of Mylar film of preferably annular shape with the thickness approximating 40 microns and a radius of approximately 1.75 mm. Sensors with radii up to 3.5 mm have been designed by the Applicants. The distance between the fiber tip and the diaphragm can be adjusted and preferably is in the range of approximately 60 microns.

These and other novel features and advantages of this invention will be fully understood from the following detailed description of the accompanying Drawings.

BRIEF DESCRIPTION OF THE DRAWINGS

FIGS. 9C and 9D for the Bruel and Kjaer 4134 condenser microphone);

DETAILED DESCRIPTION OF THE PREFERRED EMBODIMENTS

Figure 1:
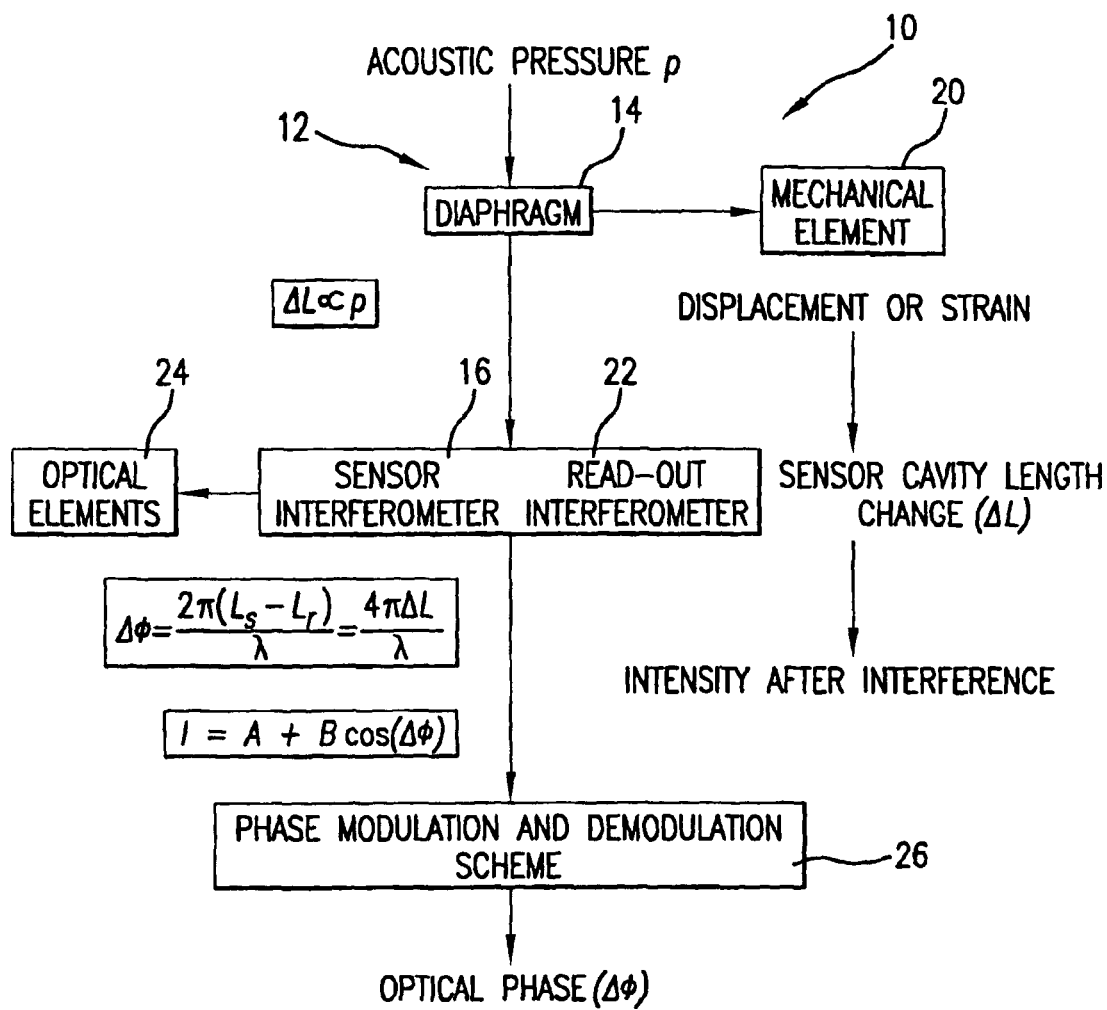
FIG. 1 is a block diagram of the sensor system design for acoustic measurements of the present invention.

Referring to FIG. 1, sensor system 10 for the acoustic measurements includes a sensor 12 having a diaphragm 14 and a sensor interferometer 16. In order to determine the parameters of a mechanical element 20 which undergoes displacement or strain, the diaphragm 14 of the sensor 12 oscillates under the influence of acoustic pressure P generated by the mechanical element 20. The sensor interferometer 16 is a Fabry-Perot interferometer. The cavity length of the interferometer, $\Delta L$ changes according to diaphragm fluctuations which permits determination of the mechanical element's parameters. Therefore, the cavity length change $\Delta L$ is the parameter which may serve to determine the acoustic pressure P.

A read-out interferometer 22 is path-matched to the sensing interferometer 16 as will be described in detail infra. The cavity length change $\Delta L$ signal is coupled to optical elements 24 which include photodetectors. The received signal (intensity at the output of the photodetectors) is decoded by phase modulation and demodulation scheme 26 to determine the optical phase change $\Delta \phi$ which is a function of $\Delta L$, and thus is related to sound pressure in accordance with a predetermined relationship which may be calculated.

Figure 2A:
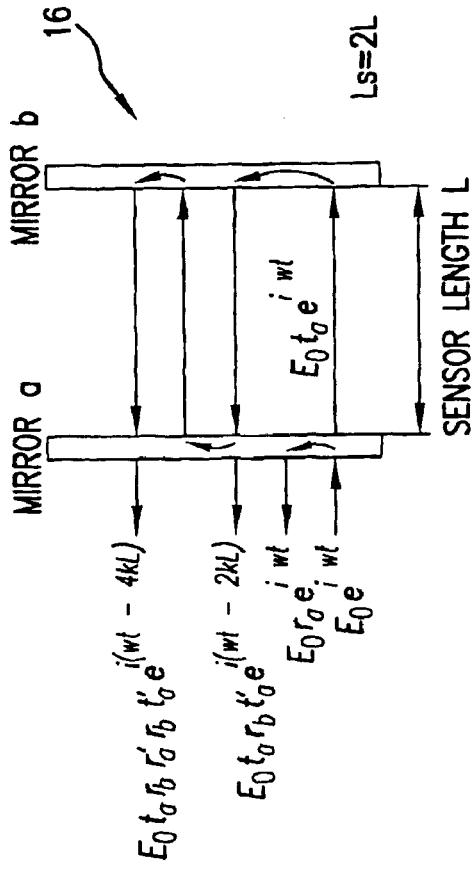
FIGS. 2A and 2B show schematically Fabry-Perot sensor interferometer and Mach-Zehnder read-out interferometer employed in the sensing system of the present invention.

The sensing system 10 of the present invention is based on a low finesse Fabry-Perot (FP) cavity shown in FIG. 2A. After the light emerges from the single mode fiber, the electric field components in the multi-beam interference with Gaussian beam expansion-induced power attenuation may be modeled as:

$$E_{1r} = E_0 r_a e^{i\omega t},$$

$$E_{2r} = E_0 t_a r_b t_a' \sqrt{\alpha} e^{i(\omega t - 2kL)}, \text{ and}$$

$$E_{3r} = E_0 t_a r_b r_a' r_b' t_a' (\sqrt{\alpha})^2 e^{i(\omega t - 4kL)} \quad (1)$$

where $r_a$, and $r_a'$ are the reflection coefficients of the mirror a, and $r_b$, $r_b'$ are the reflection coefficients of the mirror b, respectively, and $t_a$ and $t_a'$ are the transmission coefficients of the mirror a. It is noted that $r_a$ and $t_a$ are for waves traveling from glass towards air, while $r_a'$ and $t_a'$ are for waves traveling from ari towards glass. The wave number is k which is equal to $2\pi/\lambda$. The resultant reflected scalar E wave is given by $$E_r + E_0 e^{i\omega x} \quad (2)$$

$$\sqrt{R_a}\left[1 - \frac{1-R_a}{R_a}\sum_{m=1}^{\infty}(-1)^m r_b = \sqrt{R_b}\,(R_a R_b \alpha)^{\frac{m}{2}} e^{-2imkL}\right],$$

where $r_a = -r_a' = \sqrt{R}$ and $t_a t_a' = \sqrt{T_a}$, $r_b = \sqrt{R_b}$, R and T are reflectivity and transmittivity, respectively.

The transfer function $H_r$ of the Fabry-Perot interferometer may be written:

$$H_r^s = \frac{E_r E_r^*}{E_i \cdot E_i^*} = A_0 - A_1 \cdot \sum_{m=1}^{\infty}(-1)^m (R_a R_b \alpha)^{\frac{m}{2}} \cdot \cos(2mkL), \quad (3)$$

where: (4)

$$A_0 = R_a + \frac{(1-R_a)^2 R_b \alpha}{(1-R_a R_b)}, \text{ and}$$

$$A_1 = \frac{2(1-R_a-R_b\alpha+R_aR_b\alpha)}{1-R_aR_bd-1}$$

For low finesse Fabry-Perot sensor, also referred herein to as FP sensor, the transfer function may be written:

$$H_r^s = A_0 - A_1 \cdot \sqrt{R_a R_b \alpha} \cos(2kL). \quad (5)$$

Figure 2B:
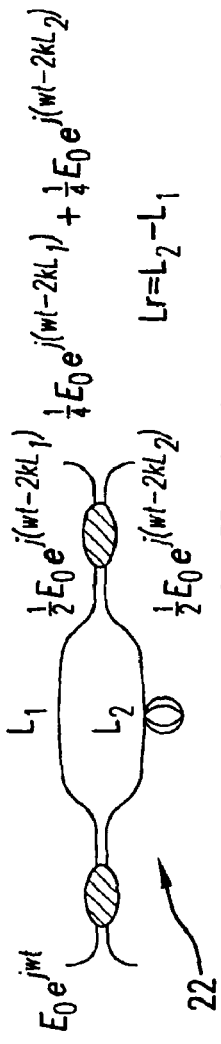
Figure 3:
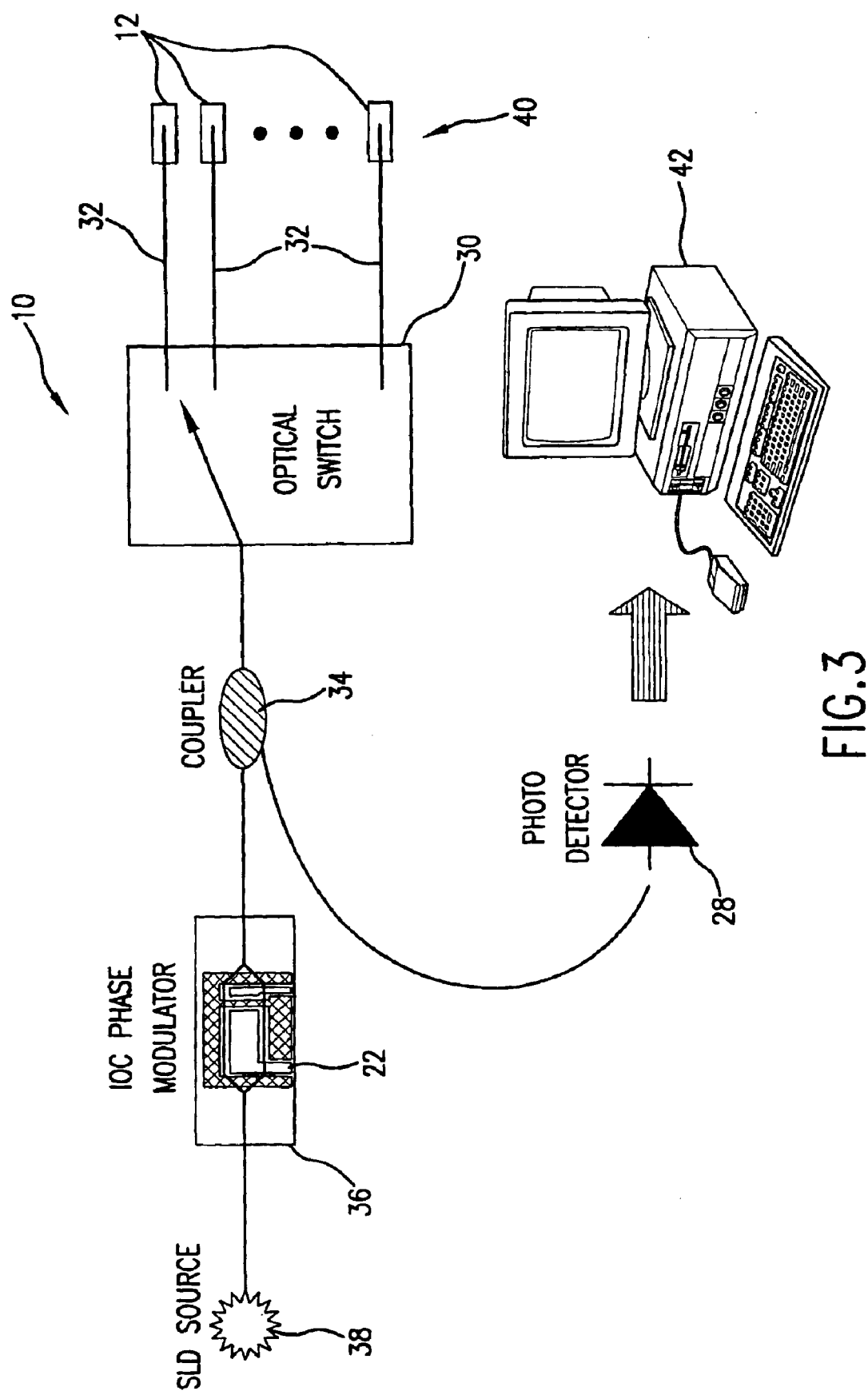
FIG. 3 is a schematic representation of the multiplexed sensor system of the present invention.

As best shown in FIGS. 1 and 3, a path matched differential interferometry (PMDI) system is designed to demodulate the FP sensor 12. In this PMDI system, the read-out interferometer 22 is path-matched to the sensing interferometer 16. The read-out interferometer 22 may be a Mach-Zehnder interferometer shown in FIG. 2B. Then the associated transfer function is $$H_r^r = \frac{E_r \cdot E_r^*}{E_i \cdot E_i^*} = \frac{1}{8}[1 + \cos 2k(L_2 - L_1)] = \frac{1}{8}[1 + \cos 2kL_r], \quad (6)$$

where $L_r$ is the cavity length of the read-out interferometer 22. When the light passes through the PMDI system, the resulting time dependent intensity function of the sensors 12, $I_T$, as detected by a photodetector 28 shown in FIG. 3, is given by:

$$I_T = \frac{1}{4}\int H_r^r H_r^s i(k) dk, \quad (7)$$

where $H_r^s$ and $H_r^r$, which are the transfer functions of the FP sensor interferometer 16 and the Mach-Zehnder read-out interferometer 22 are given by equations (5) and (6), respectively, and i(k) is the input spectrum of the broadband optical source. After carrying out the integration, equation (7) can be written:

$$I_t \approx \frac{1}{8}I_0 A_0 - \frac{1}{8}I_0 A_1 \sqrt{R_a R_b \alpha}\cos k_0 L_s e^{-\left(\frac{\pi L_T}{L_c}\right)^2} + \quad (8)$$

$$\frac{1}{8}I_0 A \cos k_0 L_r e^{-\left(\frac{\pi L_T}{L_c}\right)^2} - \frac{1}{8}I_0 A_1 \sqrt{R_a R_b \alpha}$$

$$\left\{\cos k_0 (L_s + L_r) e^{-\left[\frac{\pi(L_s+L_r)}{L_c}\right]^2} + \cos k_0 (L_s - L_r) e^{-\left[\frac{\pi(L_s+L_r)}{L_c}\right]^2}\right\},$$

where $L_c$ is the coherence length of the short coherence light source and $\Delta\lambda$ represents the half-width of the linewidth. When the system is path matched ($L_r \approx L_s$) and $L_c$ is much smaller than $L_r$ and $L_s$, coherent interference occurs only in the ($L_s - L_r$) component. Thus equation (8) may be simplified:

$$I_t \approx \frac{1}{8}I_0 A_0 - \frac{1}{16}I_0 A_1 \sqrt{R_a R_b \alpha} \cos k_0 (L_s - L_r) \quad (9)$$

Referring now to FIG. 3, which shows in more detailed form a block diagram of the system 10 of the present invention. A plurality of fiber tip based Fabry-Perot sensors 12 are provided, having the same cavity spacing, an optical switch 30 to which the fiber tip based Fabry-Perot sensors 12 are coupled by optical fibers 32. This creates N channels (corresponding to the number of the sensors 12 in the system 10), the signals of which are demultiplexed using the optical switch 30. The system 10 further includes an optical coupler 34 which couples the photodetector 28 to the optical switch 30, and the read-out interferometer 22 built-in in the Integrated Optical Circuit (IOC) phase modulator 36. The IOC phase modulator 36, particularly the read-out interferometer 22 portion thereof along with the sensing interferometer 16 of each sensor 12, creates a Path Matched Differential Interferometry (PMDI) system for demodulating signals from the sensors 12.

A Superluminescent Light Emitting Diode (SLD) source 38 generates a light beam for the system 10 of the present invention. Thus, the system 10 of the present invention includes the SLD source 38, the IOC phase modulator 36, a 2×2 optical coupler, 1×N optical switch 30, the FTFP sensors array 40, the photodetector 28, and a personal computer (PC) based data acquisition system 42. The advantage of using the optical switch 30 for Spatial Division Multiplexing (SDM) is that a larger number of sensors 12 can be detected by using the same base optical system (i.e., the SLD source 38, photodetector 28, and the modulator 36). Furthermore, each sensor 12 can be designed to either sense acoustic field at a particular location of the studied structure, or to sense a particular acoustic frequency in such a structure.

Figure 4:
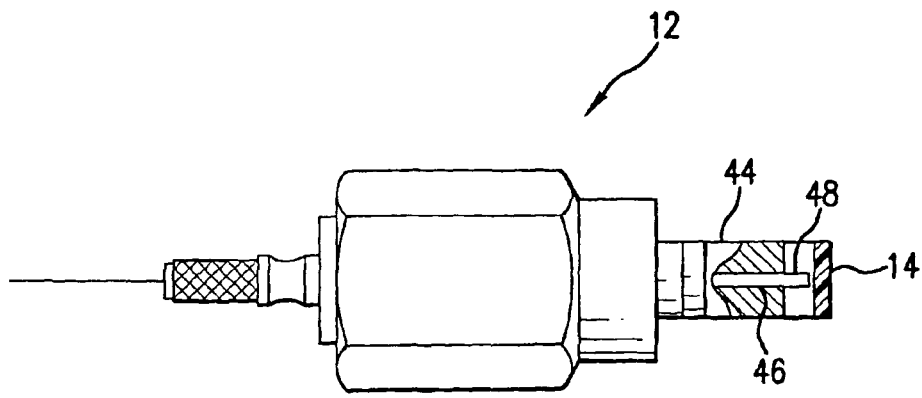
FIG. 4 is an enlarged representation of the sensing element of the present invention.

As shown in FIG. 4, the sensor 12 includes a high reliability connector ferrule 44, a fiber tip 46 passing centrally therethrough, and a diaphragm 14 (also schematically shown in FIG. 1). The diaphragm 14 is made of Mylar film with a thickness, for example, of 40 microns and a radius of, for example, 1.75 mm. The single mode fiber 46 which is fixed centrally in the connector ferrule 44, has the fiber tip 48 spaced from the diaphragm 14 by approximately 60 microns, which is half of the imbalance length in the IOC phase modulator 36. Fiber tip 48 is coated with the $TiO_2$ film by example of a SOL-GEL process which is used to form the $TiO_2$ mirror on the entire cross-section of the optical fiber 46 in order that the reflectivity of the fiber tip 48 may be increased up to 30%.

The sensor diaphragm 14 is considered as a circular plate membrane system with a fixed edge. The relationship between the displacement of the diaphragm 14 and the pressure experienced by the diaphragm 14 is determined as follows:

For an isotropic circular plate of radius $\alpha$ and thickness h, the first natural frequency of the diaphragm may be written:

$$f = \frac{10.21}{2\pi a^2}\left[\frac{Eh^2}{12\rho(1-v^2)}\right]^{1/2} \quad (10)$$

For forced oscillations, the governing equation is of the form:

$$D\nabla^4 w + \rho h \frac{\delta^2 w}{\delta t^2} - N_0 \nabla^2 w + \text{damping term} = p(t), \quad (11)$$

where p(t) is the dynamic sound pressure to be sensed with amplitude of p, $\rho$ is density of the diaphragm material, $v$ is Poisson ratio, $N_0$ is the initial plate tension, and $$D = \frac{Eh^3}{12(1-v^2)}.$$

The solution of equation (11) may be written as:

$$w(r, \theta, t) = \sum_{k=0}^{\infty} \eta_k(t) U_{3K}(r, \theta), \quad (12)$$

where $\eta_k$ are the modal amplitudes and $U_{3k}$ are the natural mode components in the principal directions. Taking advantage of the orthogonality of the modes, for a harmonic loading, equation (11) is reduced to:

$$\ddot{\eta}_k + 2\varsigma_k\omega_k\dot{\eta}_k + \omega_k^2\eta_k = F_k f(t), \quad (13)$$

where $\omega_k$ is the natural frequency of the mode of interest and $\varsigma_k$ is associated the modal damping coefficient; the different coefficients in equation (13) are given by $$\varsigma_k = \frac{\mu}{\rho\omega_k}, F_k = \frac{1}{\rho h N_k}\int_0^a pU_{sk}(r,\theta)2\pi r\,dr, \text{ and} \quad (14)$$

$$N_k = \int_0^a 2\pi r U_{sk}^2(r,\theta)\,dr$$

For harmonic excitation, the solution of equation (13) may be written:

$$\eta_k = \hat{\ }_k e^{J(\omega t - \phi_k)}, \quad (15)$$

where the amplitude function is calculated as:

$$\Lambda_k = \frac{F_k}{\omega_k^2\sqrt{\left[1-\left(\frac{\omega}{\omega_k}\right)^2\right]^2 + 4\varsigma_k^2\left(\frac{\omega}{\omega_k}\right)^2}} \quad (16)$$

Approximating the response given by equation (12) in terms of a single mode, here, the first mode, the response is written:

$$w(r,\theta) = \hat{\ }_0 U_{30}(r,\theta), \quad (17)$$

where for a plate model $$U_{30}(r,\theta) = A[J_0(kr)I_0(ka) - I_0(kr)J_0(ka)] \quad (18)$$

From equations (14) to (18), the displacement response is determined to be $$w(r,\theta) = \frac{2\pi pa}{\rho h \bar{N}_\theta k} \frac{[J_1(ka)I_0(ka) - I_1(ka)J_0(ka)]}{[J_0(kr)I_0(ka) - I_0(kr)J_0(ka)]} \omega_k\sqrt{\left[1-\left(\frac{\omega}{\omega_k}\right)^2\right]^2 + 4\varsigma_k^2\left(\frac{\omega}{\omega_k}\right)^2} \quad (19)$$

where:

$$\bar{N}_\theta = \int_0^a 2\pi r[J_0(kr)I_0(ka) - I_0(kr)J_0(ka)]^2\,dr \quad (20)$$

For a FTFP sensor, the cavity length change is due to the deflection of the diaphragm center $w_0$. Hence, the optical phase change $\Delta\phi$ is related to the sound pressure as $$\Delta\varphi = \frac{4\pi n}{\lambda}w_0 = \frac{8\pi^2 npa}{\lambda\rho h\bar{N}_\theta k}\frac{[J_1(ka)I_0(ka) - I_1(ka)J_0(ka)]}{[I_0(ka) - J_0(ka)]} \omega_k\sqrt{\left[1-\left(\frac{\omega}{\omega_k}\right)^2\right]^2 + 4\varsigma_k^2\left(\frac{\omega}{\omega_k}\right)} \quad (21)$$

where n is the reflective index of the cavity material and $\lambda$ is the wavelength of light source. In complete analysis, refer to the dissertation of Yu, M. (2002) "Fiber Optic Systems for Acoustic Measurements", Univ. of Maryland, College Park.

The above equation (21) is used to describe how the sound pressure deflects the diaphragm and how this resulting deflection produces an optical phase change in the FTFP sensor. To extract the phase from the optical sensor output, the phase demodulation system 26, shown in FIG. 1, which includes the IOC phase modulator 36 is employed.

Figure 5B:
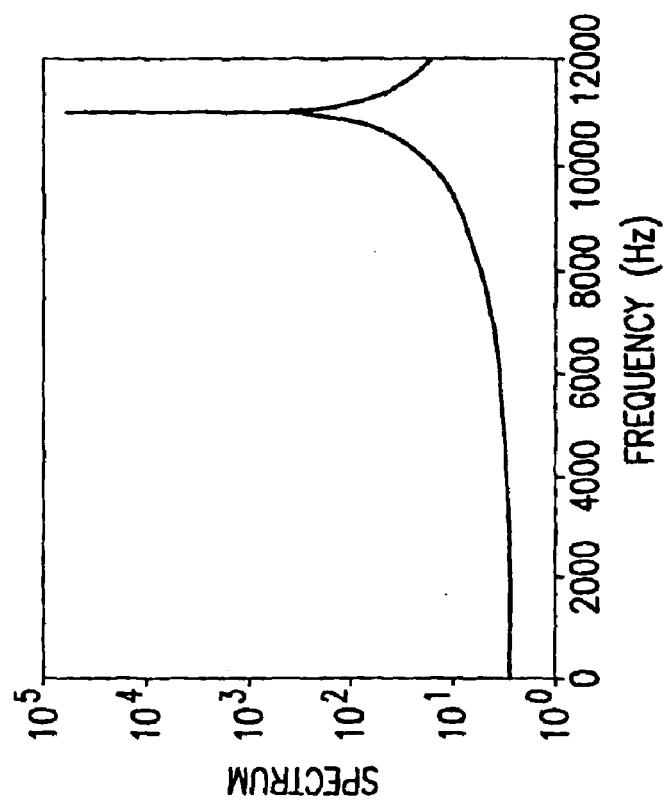
FIGS. 5A and 5B are diagrams representing displacement of the diagram center vs. SPL (Sound Pressure Load) and the frequency response of the diaphragm respectively.
Figure 5A:
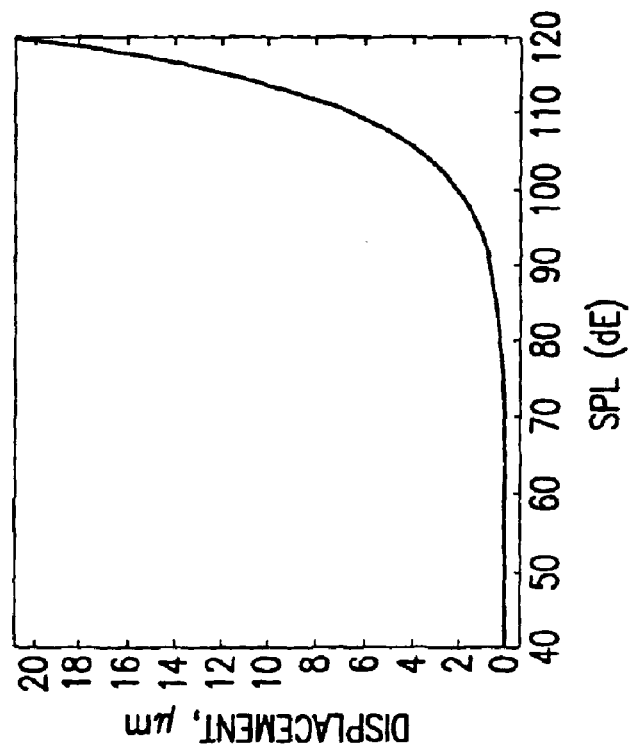

Equation (21), reflects the fact that a compromise between the bandwidth and sensitivity is required. For a particular diaphragm material, the upper frequency limit may be increased by increasing the thickness "h" of the diaphragm or by decreasing the radius "a". However, an increase of "h" or a decrease in "a" reduces the displacement $\omega_0$ and thus reduces the sensitivity of the diaphragm. To measure the pressure gradient, it is desirable to have the diaphragm size as small as possible to obtain adequate resolution and accuracy. For example, a diaphragm with a radius of 3 mm and a thickness of 4.0 microns may be chosen. For this diaphragm in FIGS. 5A and 5B, the relationship between the SPL (Sound Pressure Load) vs. displacement and the frequency vs. response curve are shown.

Figure 6:
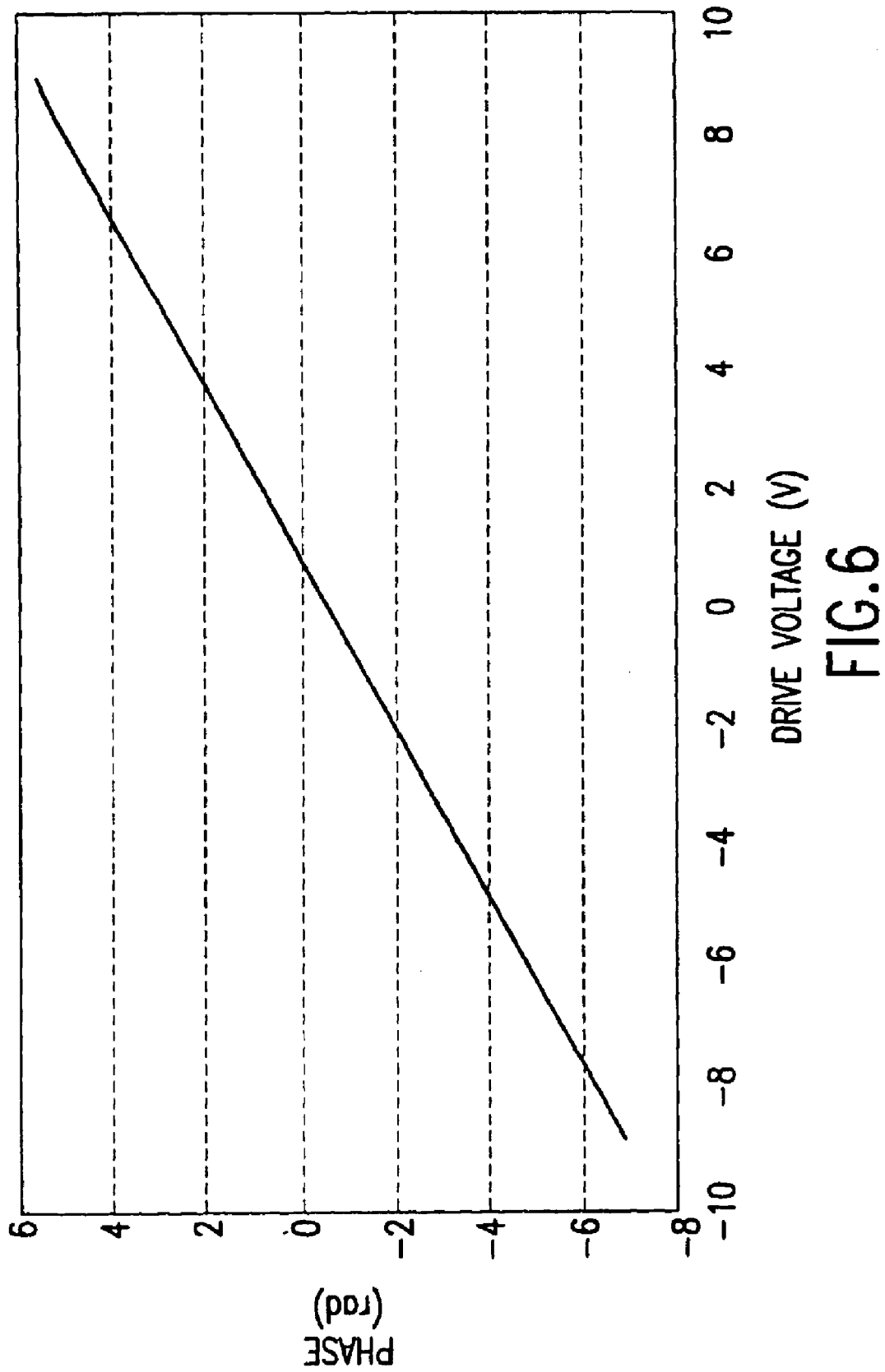
FIG. 6 is a diagram showing a calibration curve of the Integrated Optical Circuit (IOC) phase modulator employed in the system of the present invention.

The phase modulation-demodulation system 26 shown in FIG. 1 implemented for the current sensor design, is a PC-based pseudo-neterodyne scheme based on a four-step phase-stepping algorithm. In this scheme, the optical signal generated by the SLD source 38 is modulated by the IOC phase modulator 36 instead of a traditional PZT modulator. This technique offers numerous advantages: a) high optical output power, b) large frequency range (up to 3 GHz), c) rejection of electrical noise, d) high dynamic range, and e) very high stability. Experiments have been conducted to calibrate corresponding phase output of the IOC phase modulator 36 for different drive voltages as shown in FIG. 6.

Figure 7:
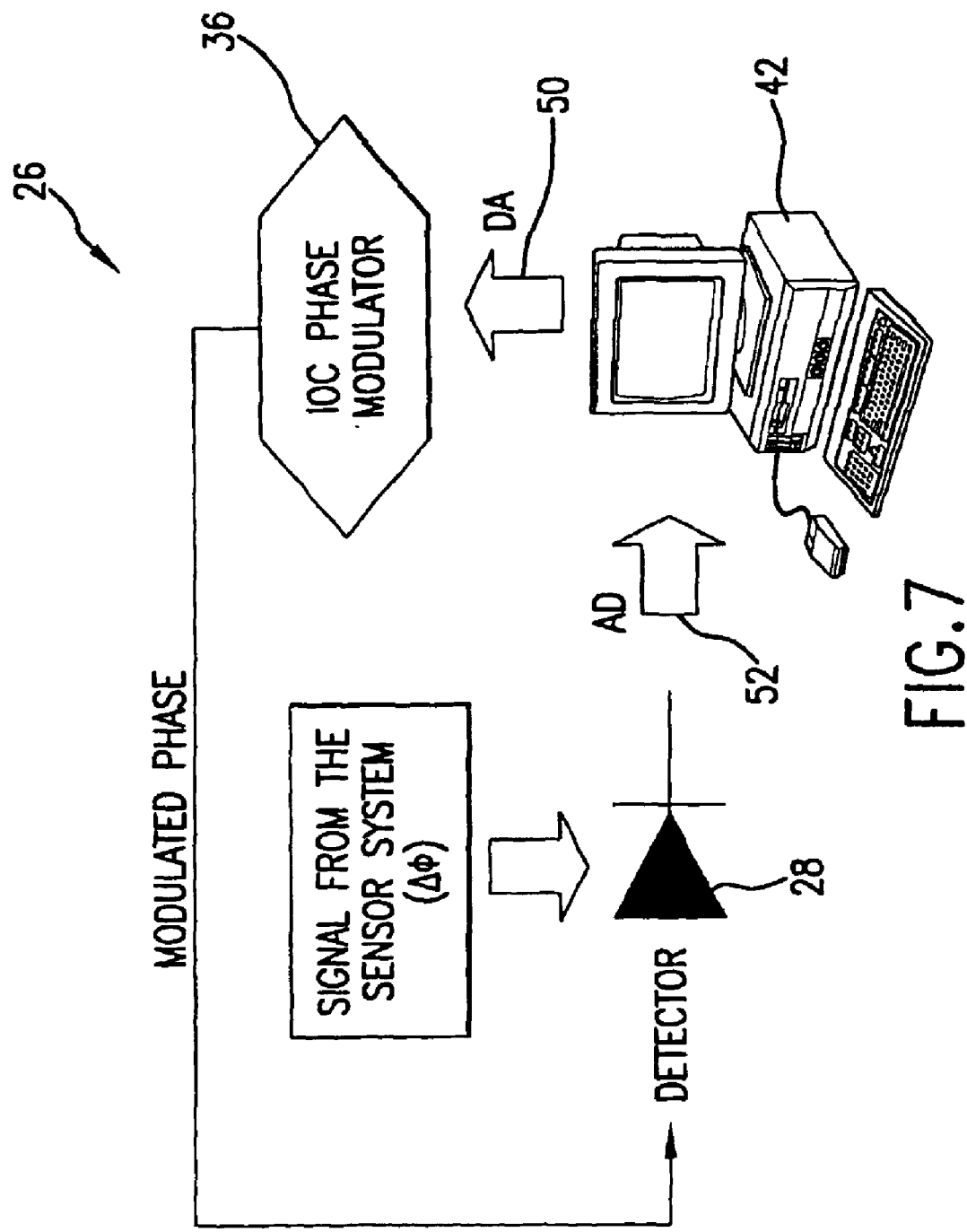
FIG. 7 is a schematics of PC-based digital phase modulation and demodulation scheme of the present invention.
Figure 8A:
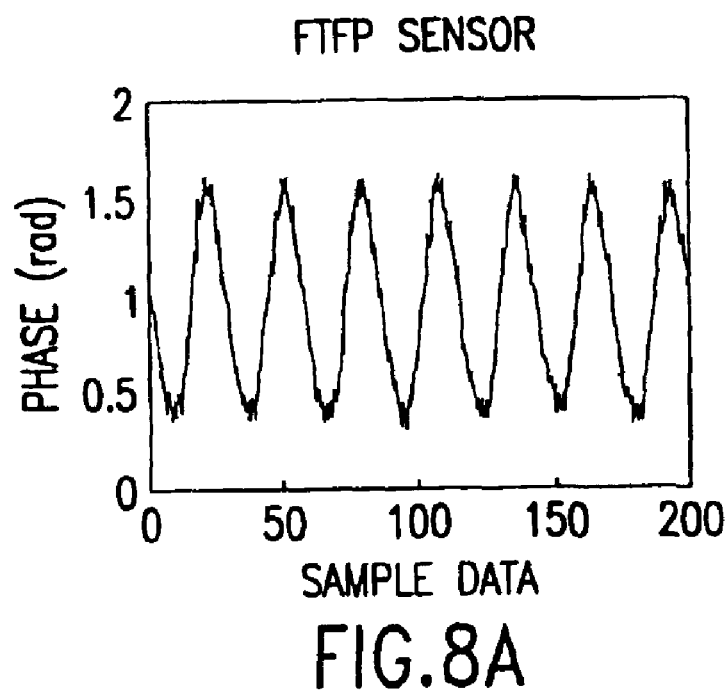
FIGS. 8A–8D are diagrams representing experimental results of the fiber based sensor (FIGS. 8A and 8B) compared to the experimental results of a Bruel and Kjaer 4135 condensor microphone (FIGS. 8C and 8D) performed at 70 Hz.
Figure 8B:
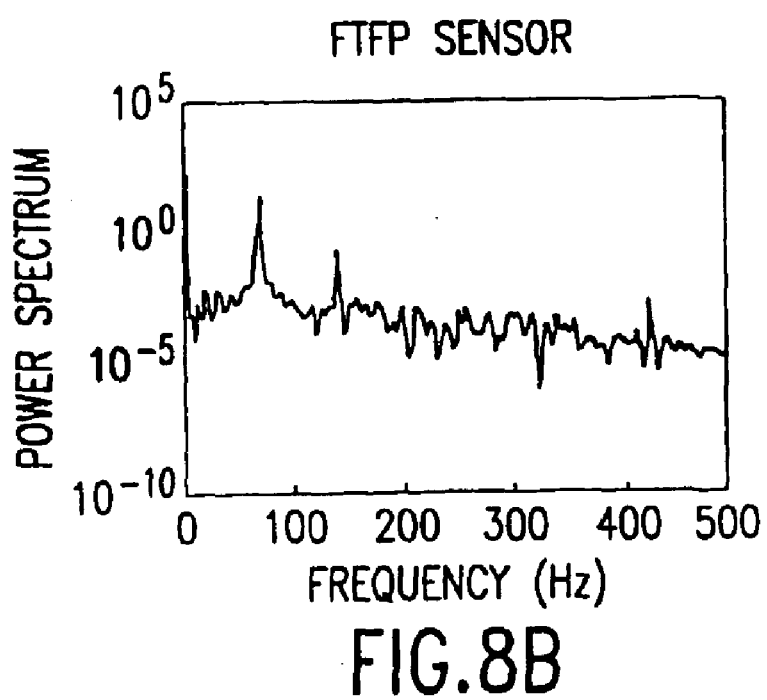
Figure 8C:
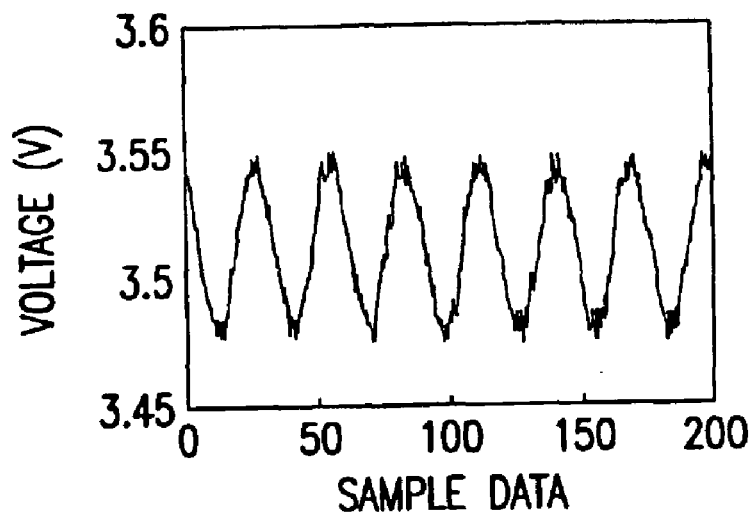
Figure 8D:
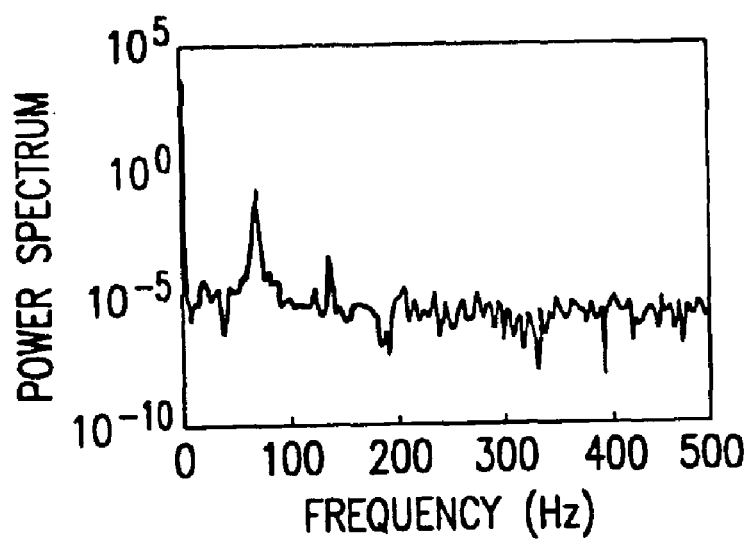
Figure 9A:
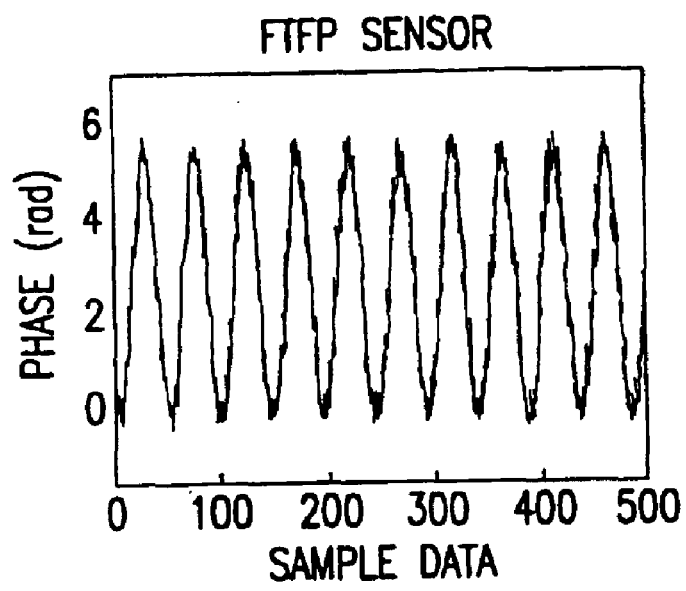
FIGS. 9A–9D are diagrams representing experimental results for a study performed at 2.3 KHz (FIGS. 9A and 9B for the fiber based sensor.
Figure 9B:
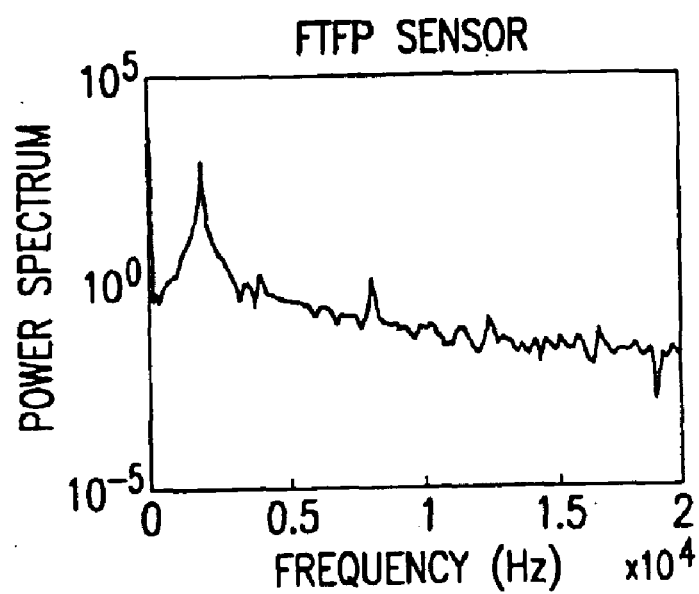
Figure 9C:
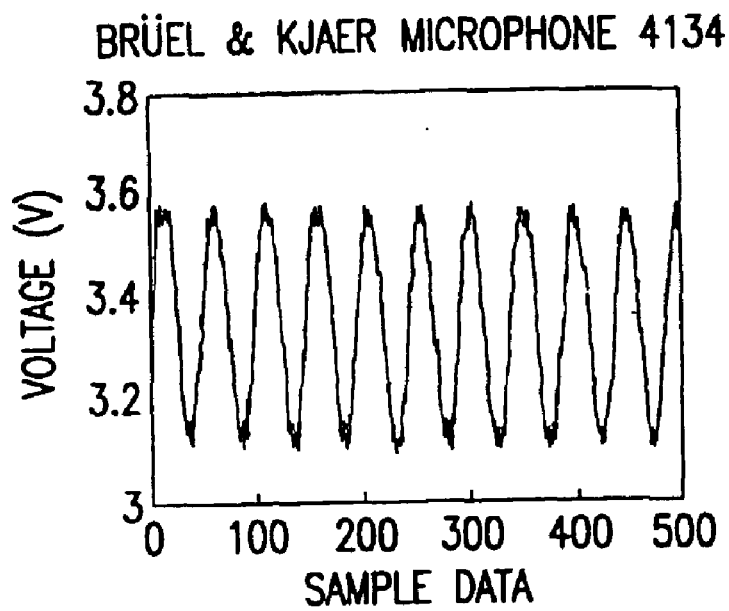
Figure 9D:
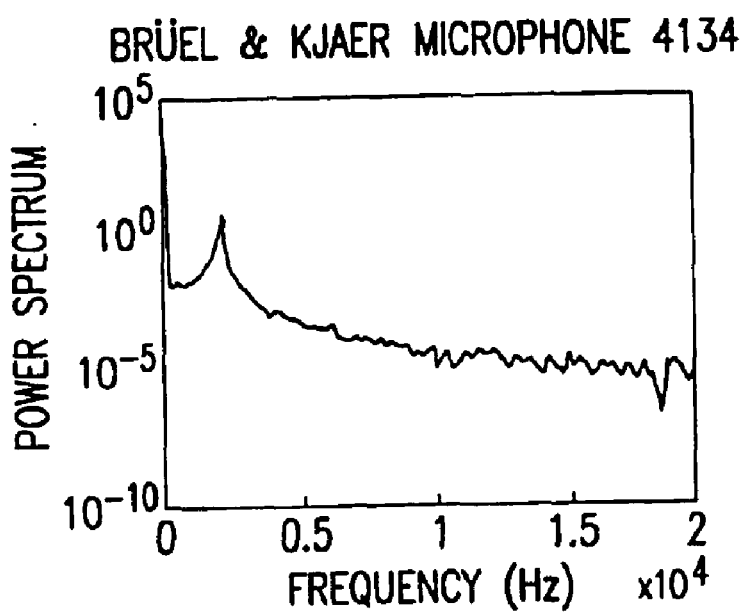
Figure 10A:
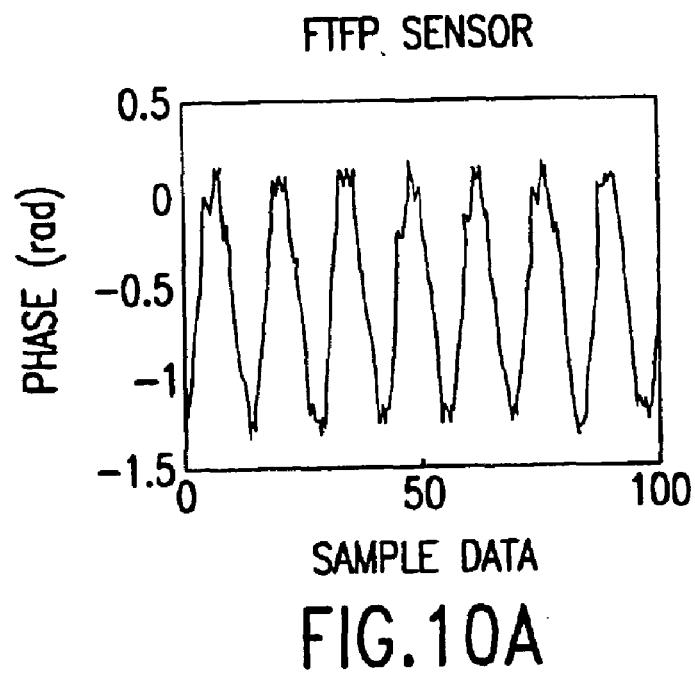
FIGS. 10A–10D are diagrams representing experimental results for a study performed at 7.5 KHz for the fiber based sensor (FIGS. 10A and 10B) vs. the Bruel and Kjaer 4134 condenser microphone (FIGS. 10C and 10D)
Figure 10B:
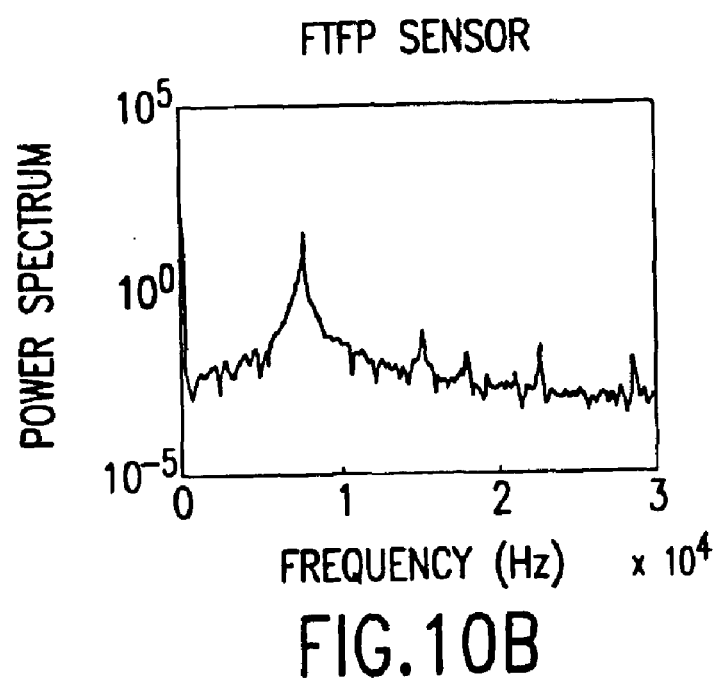
Figure 10C:
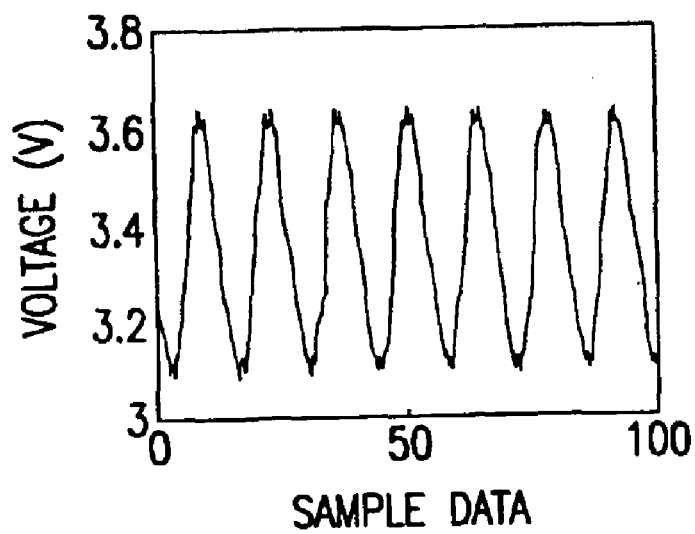
Figure 10D:
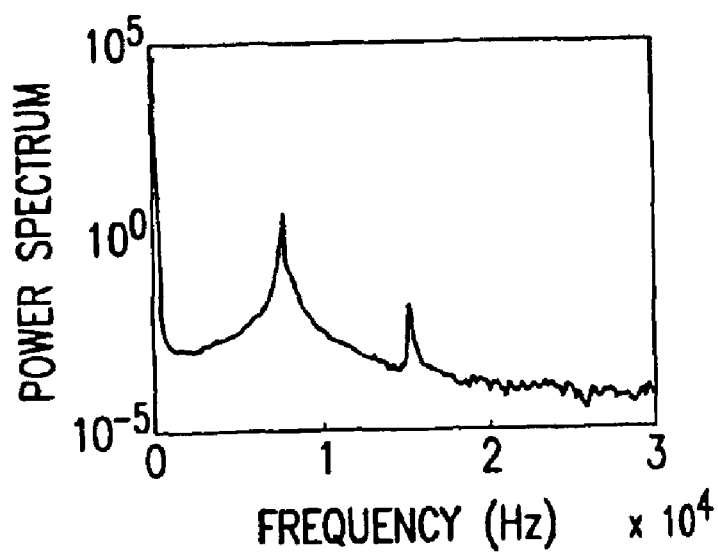

Referring to FIG. 7, the modulation signal which is a discrete sawtooth wave is generated from the digital-to-analog output 50 of the PC 42. In every period of the modulation signal, four digital voltages are generated and used to drive four step modulated phase values from the IOC phase modulator 56 based on the calibration curve shown in FIG. 6. Subsequently the modulated phases are added to the sensor phase change. The combined phase signal is detected by the high speed photodetector 28 and sent to the analog-to-digital input 52 of the PC 42. The modulation frequency used is 100 kHz and the depth of modulation is approximately $3\pi/2$.

In order to demodulate the received signal, the optical intensity detected by the sensors 12 is sampled four times during each period of the modulation signal. A 12-bit National Instruments digital acquisition board is then triggered to record the intensity every $\pi/2$ radians of the modulation signal. When the depth of modulation is set to $3\pi/2$ and the sampling rate is synchronized with the modulation frequency, the four consecutive optical intensity measurements yield the following:

$$I_0 = A + B\cos(\Delta\phi_s + 0) = A + B\cos(\Delta\phi_s), \quad (22)$$

$$I_1 = A + B\cos\left(\Delta\phi_s + \frac{\pi}{2}\right) = A - B\sin(\Delta\phi_s),$$

$$I_2 = A + B\cos(\Delta\phi_s + \pi) = A - B\cos(\Delta\phi_s),$$

$$I_3 = A + B\cos\left(\Delta\phi_s + \frac{3\pi}{2}\right) = A + B\sin(\Delta\phi_s).$$

The sensor phase is then determined from these four intensity values by using the following arc-tangent function:

$$\Delta\phi_s = \tan^{-1}\left(\frac{I_3 - I_1}{I_0 + I_2}\right). \quad (23)$$

Equation (23) provides a way to determine the phase signal the user is trying to detect. However, care has been taken whenever the denominator in equation (23) passes through a zero. Since, the inverse tangent function is multi-valued, the unwrapping algorithm, is written to detect this discontinuity, and either an addition or subtraction of a phase of $\pi$ from $\Delta\phi_s$ is carried out to maintain a continuous phase. The advantage of this algorithm is that the modulation frequency can be much higher than that used in the other techniques and the phase error is relatively low.

An experimental sensor system based on Fabry-Perot principles shown in FIGS. 1–4, and 7 has been built. The system consists of the SLD source 38, one 2×2 optical coupler 34, the FTFP sensor 12, an IOC phase modulator 36, a photodetector 28, and a data acquisition personal computer 42. The Fabry-Perot cavity is produced between the fiber tip 48 and a diaphragm structure 14. The frequency response range of the diaphragm structure 14 extends to 10 kHz. Light from the SLD 38 is initially sent to the IOC phase modulator 36, and then via the coupler 34 to the FTFP sensor 12.

The reflected light from the FTFP sensor 12 is then sent to the high speed detector 28. The Mach-Zehnder interferometer 22 internal to the IOC phase modulator 36 is path-matched to the FTFP sensor 12 to act as a read-out interferometer. The path matching is accomplished by moving a micro-stage (not shown) to adjust the distance between the fiber tip 48 and the diaphragm 14. The IOC phase modulator 36 is driven by the four step phase stepping algorithm described supra at a very high frequency (100 kHz).

In the application system run, a condenser microphone (Bruel & Kjaer model #4134) was used as reference sensor for validation. The input acoustic signal was generated by an Altec Lansing computer speaker system (Model No. ACS340). The diaphragm 14 of the FTFP sensor 12 was excited by using the speaker. The vibration changes the distance between the fiber tip 48 and the diaphragm 14 which is related to the optical phase change. In order to detect this unknown phase change, the phase demodulation algorithm described supra was employed. The entire phase modulation and demodulation process was controlled by a PC-based digital signal processing program.

The acoustic sensor 12 was operated in a frequency range of approximately 50 Hz to 7.5 kHz by using sinusoidal sound signals. The sensor results have been compared to the results of a Bruel & Kjaer 4134 condenser microphone. Representative results from studies performed at 70 Hz, 2.3 kHz and 7.5 kHz are shown in FIGS. 8A–8D, 9A–9D, and 10A–10D, respectively. The optical sensor data complies well with the condenser microphone in both time domain and frequency domain.

Figure 11A:
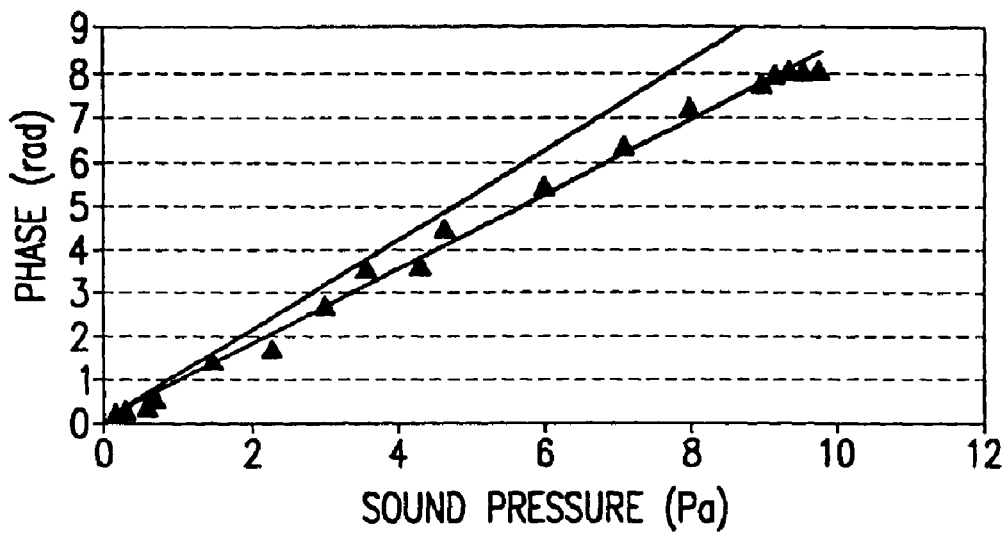
FIGS. 11A and 11B are the diagrams, respectively, of phase vs. sound pressure and sensitivity vs. frequency of the fiber based sensor of the present invention.
Figure 11B:
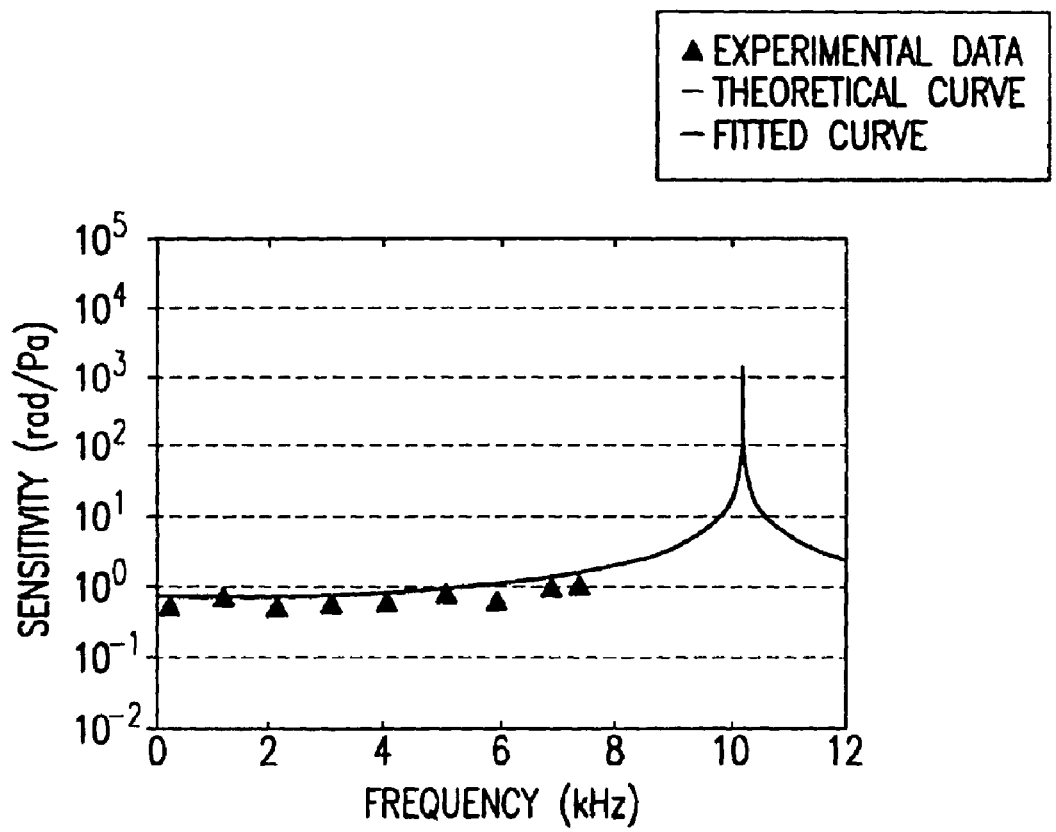

The above results are demonstrative of the applicability of the FTFP sensor system of the present invention for acoustic measurements. The studies show that the system can be used in the frequency range from 50 Hz to 7.5 kHz. The sensitivity and dynamic range of the sensor 12 are also determined and the experimental and model results are shown in FIGS. 11A–11B. It is found that the experimental sensitivity is lower than the model prediction determined from equation (21). A probable explanation is that the air gap between the diaphragm 14 and the connector ferrule 44 of the sensor 12 provides additional damping to the vibration of the diaphragm 14. Based on FIGS. 11A–11B, the sensitivity and dynamic range of the sensor are determined to be 0.9 rad/Pa and 60 dB to 118 dB, respectively.

Operational results have shown that the sensor of the present invention is able to capture the acoustic field with an acceptable accuracy and confirm the model predictions.

As disclosed supra, the fiber tip based Fabry-Perot sensors may be used for detecting and measurements of acoustic pressure and further can serve as a microphone. Noise is transmitted into the enclosure through a flexible boundary, and the fiber tip sensors of the present invention sense and permit measurement of the acoustic pressure both inside and outside the enclosure.

To widen the application of the principles of the present invention, fiber optic sensors can be used for active acoustics control as air particle velocity sensors and acceleration sensors. To build a fiber tip velocity sensor of the present invention, six pressure microphones (based on fiber tip Fabry-Perot sensors) are mounted on a sphere of a predetermined radius and a finite difference scheme is used to predict the air particle velocity from the pressure measurement made by fiber tip based Fabry-Perot sensors of the present invention. This type of arrangement of the fiber tip velocity sensor of the present invention permits greater flexibility since "small size" microphones (fiber based Fabry-Perot sensors of the present invention) have high sensitivity and are not susceptible to interference effects. The velocity sensor of the present invention 54 includes two fiber tip microphones of the present invention disclosed supra in each direction of the XYZ coordinate system. For the sake of simplicity of the further description of the velocity sensor 54 of the present invention, only one direction is presented, however, the same procedure applies for a three-dimensional velocity sensor with some restrictions.

Figure 12:
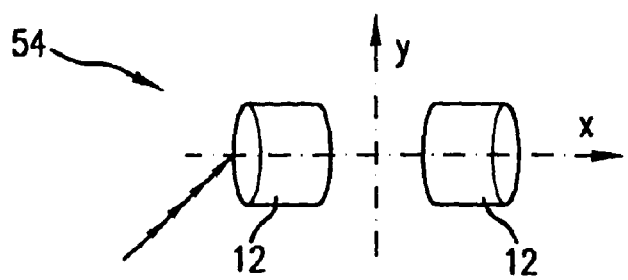
FIG. 12 is a simplified schematic representation of the velocity sensor of the present invention.

As shown in FIG. 12, illustrating a simplified model of the velocity sensor 54 of the present invention, two FTFP sensors 12 are positioned in the direction X with the center point of the velocity sensor 54 coincident with the origin of the XY coordinate system.

For one-dimensional wave propagation, the governing equation is given by:

$$\frac{\delta P(x, t)}{\delta x} = -\rho_0 \frac{\delta u(x, t)}{\delta t} \quad (24)$$

where p(x,t) and u(x,t) are, respectively, the pressure and particle velocity at point x and time t, and $\rho_0$ is the medium mass density.

In order to construct the velocity sensor, the partial differential equation may be simplified by using finite difference schemes. Assuming that the distance between the two pressure microphones 12 along x-axis is l and the velocity is sampled at time intervals $\delta T$, if a second order central finite difference scheme is used for the spatial differentiation and a second order forward scheme is used for the time differentiation, Eq. (24) can be approximated in the following form:

$$\frac{p(l/2, T) - p(-l/2, T)}{l} = -\rho_0 \frac{3u(0, T) - 4u(0, T - \delta T) + u(0, T - 2\delta T)}{2\delta T} \quad (25)$$

from which, the air particle velocity at the origin is determined to be:

$$u(0, T) = \frac{1}{3}\Big[4u(0, T - \delta T) - \quad (26)$$

$$u(0, T - 2\delta T) - \frac{2\delta T}{\rho_0 l}[p(l/2, T) - p(-l/2, T)]\Big]$$

These two finite difference schemes are chosen since they have errors of order $O(l^2)$ and $O(\delta T^2)$, respectively. In order to examine the error associated with the chosen schemes, the following analysis is carried out. Consider an incident wave at an angle $\theta$ with respect to the x-axis. The pressure magnitudes at the pressure microphones 12 located at (−l/2) and (l/2) are, respectively:

$$p\left(-\frac{l}{2}, T\right) = Pe^{j\left(\omega T \frac{kl}{2}\cos\theta\right)} \quad (27)$$

$$p\left(\frac{l}{2}, T\right) Pe^{j\left(\omega T \frac{kl}{2}\cos\theta\right)}$$

where k is the wave number (k=ω/c) and c is the sound velocity in the medium. In these equations, the wave component parallel to the diaphragm plane (k y sin θ) is neglected. This is acceptable for k a<<1, where a is the diameter of the diaphragm. Making use of Eqs. (27) on the left-hand side of Eq. (25) it is found:

$$\frac{p\left(\frac{l}{2}, T\right) - p\left(-\frac{l}{2}, T\right)}{l} = \frac{P}{l}e^{j\omega t}\left[j2\sin\left(\frac{kl}{2}\cos\theta\right)\right] \quad (28)$$

For a small incident angle and low frequency values (k l<1), this equation becomes, $$\frac{p\left(\frac{l}{2}, T\right) - p\left(-\frac{l}{2}, T\right)}{l} \approx jkP\cos\theta e^{j\omega t} \quad (29)$$

The exact solution for the pressure at point x due to the incident wave is $$p(x,t) = Pe^{j(\omega t + x \cos \theta)} \quad (30)$$

whose first derivative, when evaluated at the origin is:

$$\left.\frac{\delta p(x + r)}{\varepsilon_{DC}}\right|_{x=0} = jkP\cos\theta e^{j\omega x} \quad (31)$$

Figure 13:
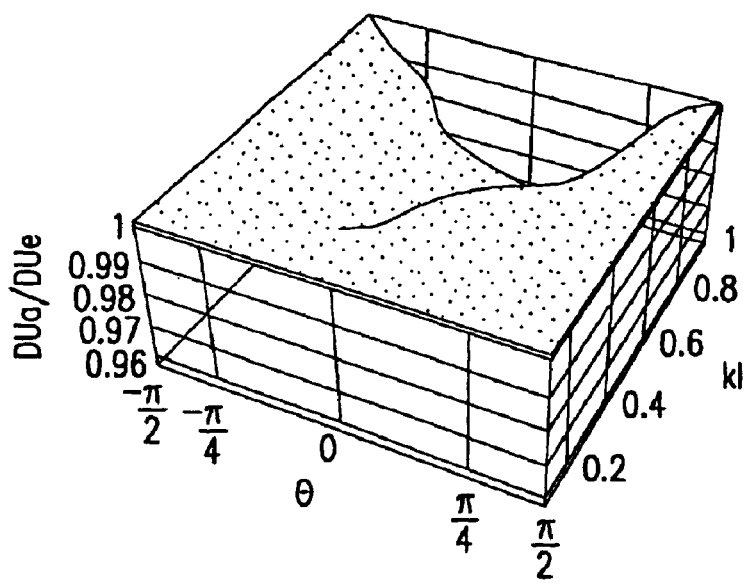
FIG. 13 is a diagram showing variation of the ratio of finite difference scheme result $Du_a$ to exact solution $Du_a$ with respect to k, l and $\theta$.

This equation is identical to the finite difference approximation scheme. The relative comparison between the finite difference approximation scheme [Eq. (28)] and the exact solution [Eq. (36)] is plotted for different values of k l and θ in FIG. 13. In this Figure, $Du_a$ represents the result of the finite difference scheme given by Eq. (28) and $Du_e$ represents the result of the exact solution given by Eq. (31).

It should be noted that as k l increases, not only does the relative error increase, but other sources of error must also be considered. There exist errors associated with diffraction of sound waves, errors associated with neglecting the wave component parallel to the diaphragm plane (k y sin θ), and errors associated with the relative orientations of the pressure microphones relative to each other.

In particular, these kinds of errors increase in magnitude dramatically as the wave frequency increases. The assumption of plane wave approximation is then no longer valid as one gets closer to the sound source (which corresponds to small values of k l), and relationships must be derived based on spherical wave considerations. In this type of situation, the relation of particle velocity to pressure is:

$$\frac{U}{P} = \frac{1}{\rho_0 c \cos\theta}; \cos\theta = \frac{kr}{\sqrt{1+(kr)^2}} \quad (32)$$

where r represents the distance from the source to the point of interest. This relationship is simply the reciprocal of the specific acoustic impedance of the medium.

Figure 14:
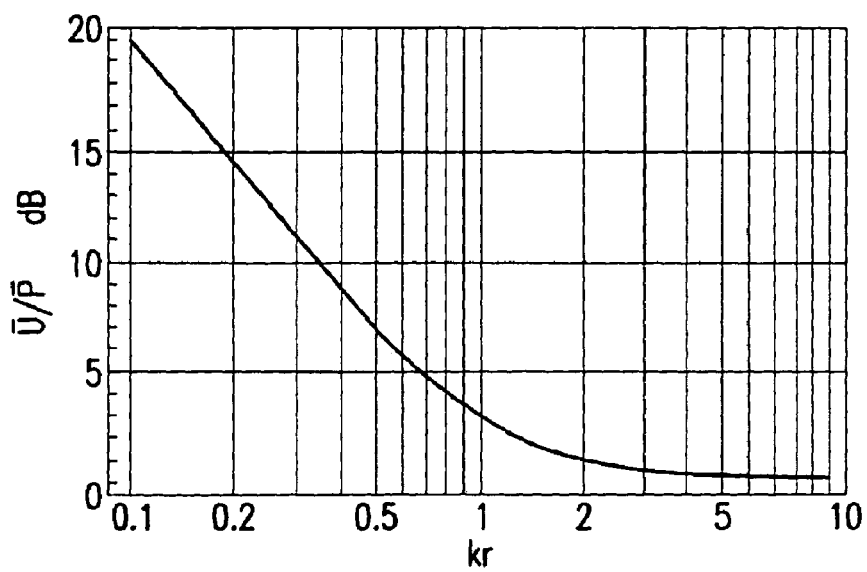
FIG. 14 is a diagram showing reciprocal of the specific acoustic impedance, scaled with $\rho c$ and normalized to have a unit value at kr=10.0.

The result from Eq. (32) is plotted in FIG. 14 as a function of k r. The plot is normalized in order that the ratio has a unit value at k r=10.0 (i.e., both the pressure microphone and velocity sensor have the same output amplitude if they were to be placed at a distance r and exposed to spherical wave with a frequency f such that k r=10.0). As an example, to emphasize the effect of such a close location to a sound source, for a wave with a frequency 100 Hz propagating in air, the relative response of a velocity sensor 54 to a pressure microphone will increase by more than 40% (3.0 dB) if they were to be placed at about 0.5 m from the sound source (this situation corresponds roughly to k r=1.0). This illustrates why a velocity sensor 54 is more sensitive than a pressure microphone when both are located near a sound source.

Figure 15:
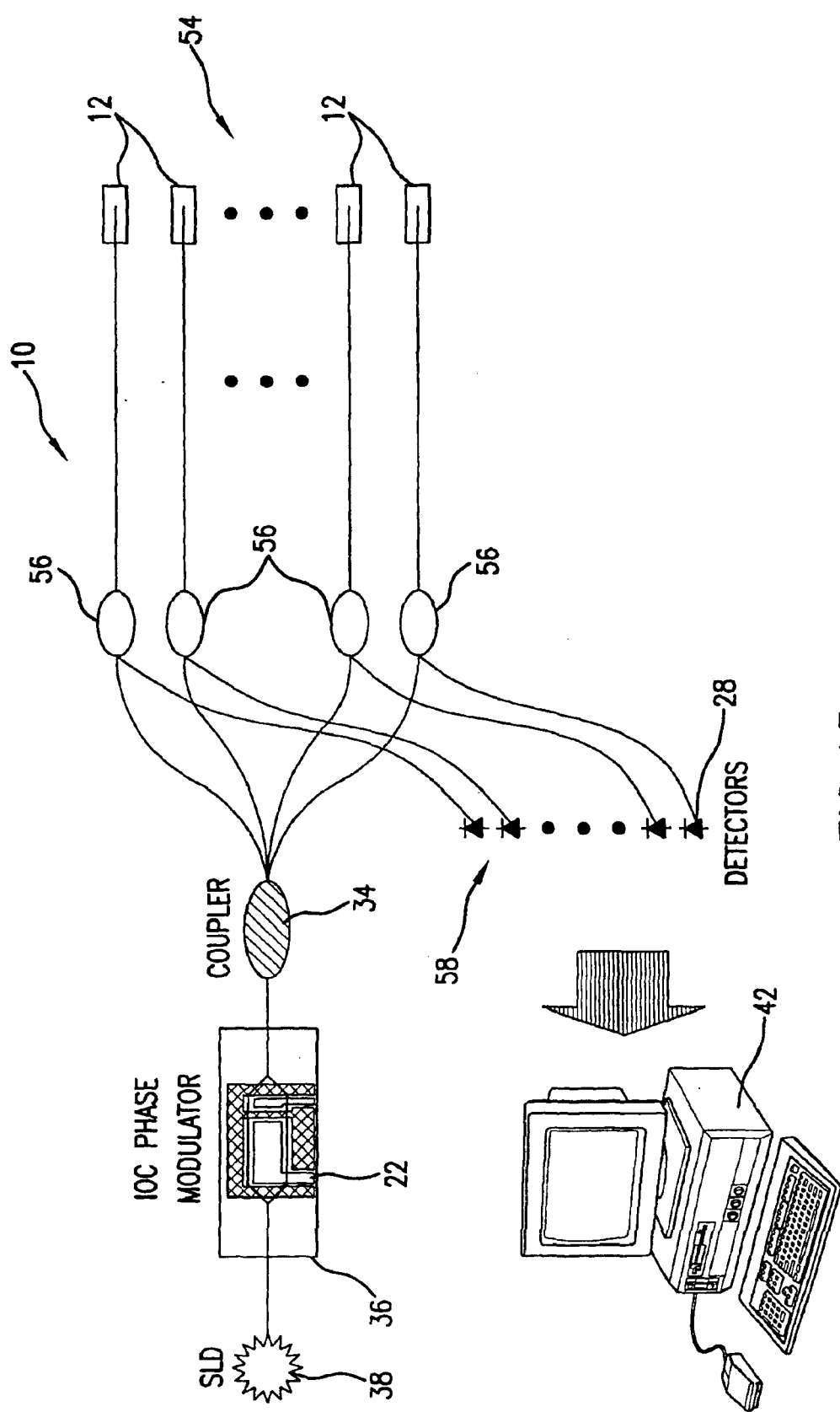
FIG. 15 is a multiplexed fiber tip based Fabry-Perot sensor system with the multiplexing on the input side which can be used as a velocity sensor.
Figure 16A:
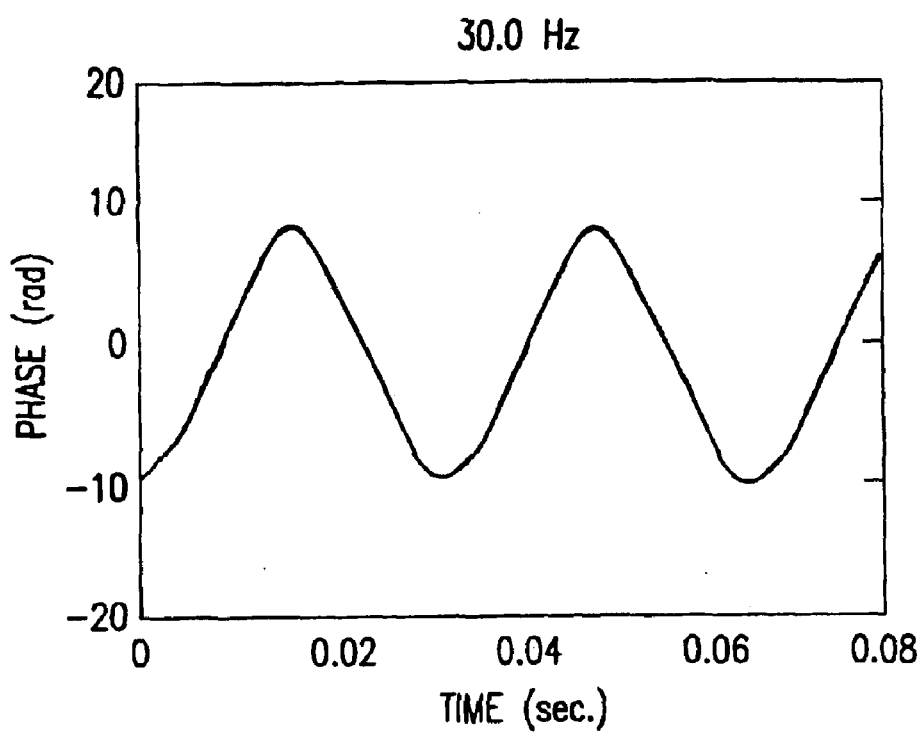
FIGS. 16A–16D illustrate the diagrams representing velocity sensor results such as phase vs. time and dB vs. frequency at 30 Hz and 1 KHz, respectively.
Figure 16B:
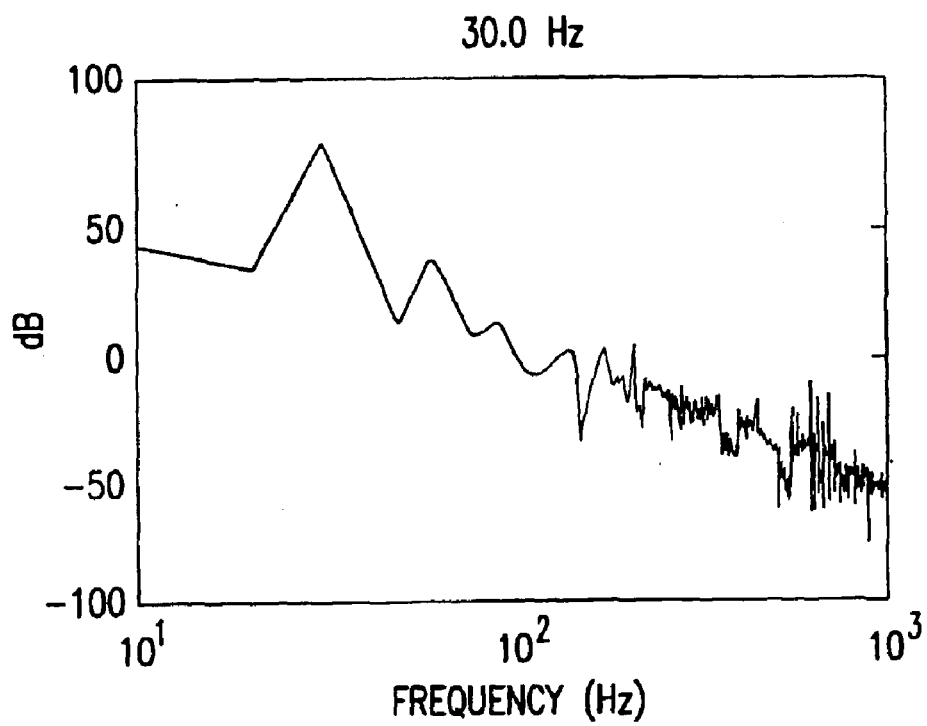
Figure 16C:
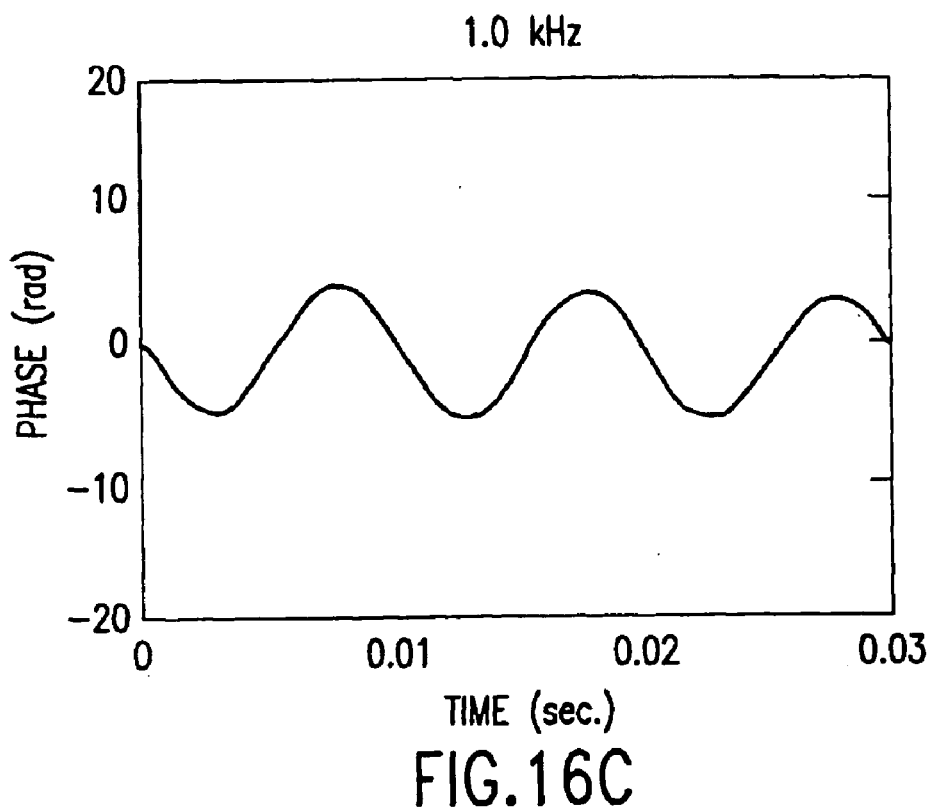
Figure 16D:
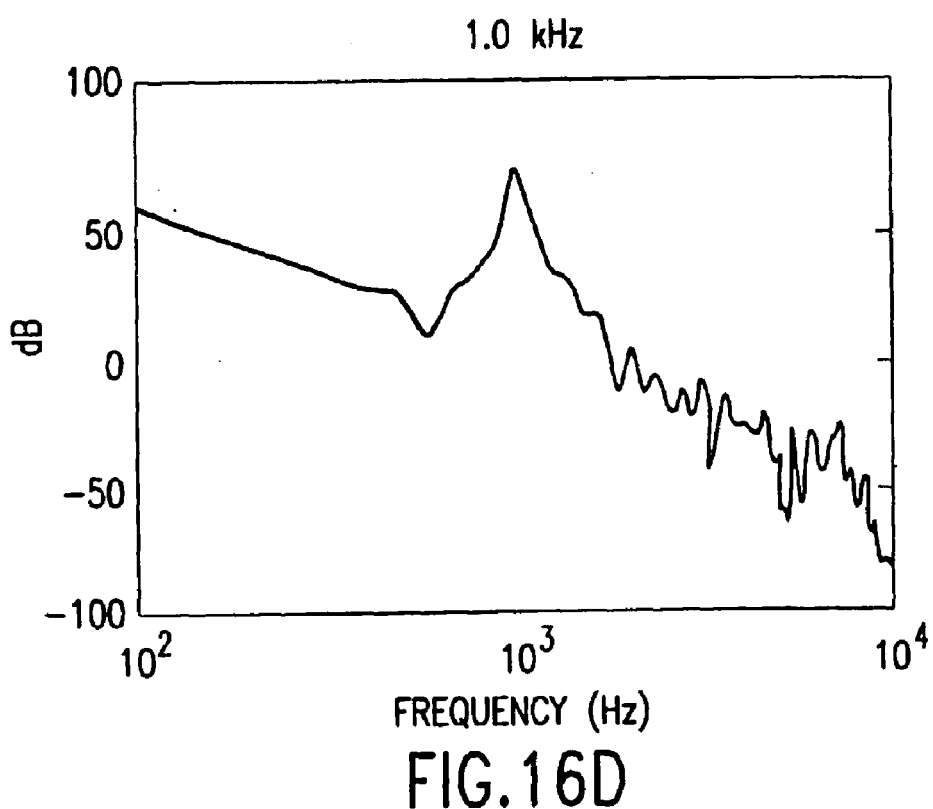

The velocity sensor 54 of the present invention may be arranged as a multiplexed fiber tip based Fabry-Perot sensing system shown in FIG. 15. In this implementation, two fiber tip microphones (or sensors) 12 are aligned in each direction of the x y z coordinate system. For each of the FTFP sensors 12, there is an optical coupler 56 through which each sensor 12 is coupled to a respective photodetector 28 from the photodetector array 58 and then to the coupler 34. The output of the detectors 28 are coupled to the A-D input of the PC 42 and the coupler 34 is connected to the IOC phase modulator 36 with the read-out interferometer 22 built therewithin. The calculations are performed by the PC 42 in accordance with the equations (24–32) supra.

For the velocity sensor 54, the separation l between the two pressure microphones was chosen to be 25.0 mm. The finite difference scheme of equation (26) was conducted digitally by the PC 42. An identical pressure microphone (the FTFP sensor) was set exactly at the midpoint between the two pressure microphones (sensors) to conduct the energy measurements. All the FTFP sensors (or the pressure microphones) had the same orientation; that is 90° relative to the incident wave. The wave was generated by using a commercial speaker that was located 348.0 mm away from the microphone in the middle of the measurement scheme. With this distance consideration, the value k r is approximately 10.0 at the excitation frequency of 1.5 kHz. Other orientations of the sensors have been also analyzed, since orientation of the pressure microphones (sensors) is important at high frequencies.

However, for this particular arrangement, the study showed that its effect is also negligible up to about 850 Hz. The velocity sensor has been examined experimentally in the frequency range 30.0 Hz to 2.0 kHz. The measurements of the velocity sensor were normalized such that at the excitation frequency of 1.5 kHz, the amplitude of the velocity sensor 54 is the same as the amplitude of the pressure sensor located in the middle. This normalization was done in order to verify the results shown in FIG. 14. Representative results from studies performed at 30.0 Hz and 1.0 kHz are shown in FIGS. 16A–16D. It is seen that the output of the velocity sensor 54 of the present invention increases as the excitation frequency decreases.

In addition to the pressure and velocity sensors, a fiber-tip accelerometer has been developed as part of the active vibration control (AVC) and ASAC systems. Such control systems require high sensitivity and low mass accelerometers. The accelerometer 60, shown in FIGS. 17A and 17B, includes a uniform cantilever beam 62 fixed to the accelerometer housing 64. As the accelerometer vibrates due to base 66 excitation z(t), the cantilever tip 68 oscillates about the undeformed axis 70 and the deflection w(x,t) at any point x along the axis 70 of the beam 62 is a function of the excitation acceleration.

The fiber-tip sensor 12 measures the beam deflection at an intermediate point 72 located at a distance measured from the fixed end which may be chosen to improve the response of the accelerometer.

The absolute vertical position P(x) of a point 72 on the beam 62 at distance x from the root end 74 is given by:

$$P(x,t) = z(t) + w(x,t) = z(t) + \sum_{n=1}^{\infty} \phi_n(x) q_n(t) \quad (33)$$

where the $\phi_n(x)$ are the mode shapes of the cantilever beam 62. For an Euler-Bernoulli beam, the higher natural frequencies are related to the fundamental frequency as follows:

$$f_2 = 6.267 f_1, \; f_3 = 17.550 f_1, \; f_4 = 34.390 f_1 \quad (34)$$

and this may be used to design the sensor by using a finite number of modes. The system equations can be written in the state space form:

$$\dot{y}(t) = Ay(t) + Bz(t)$$

$$w(x,t) = C(x)y(t)$$

$$y(t) = \{q(t)\dot{q}(t)\}^T$$

$$A = \begin{bmatrix} \underline{0}(N,N) & I(N,N) \\ -M^{-1}K & -M^{-1}D \end{bmatrix}, B = \begin{bmatrix} \underline{0}(N,1) \\ M^{-1}W \end{bmatrix},$$

$$C(x) = [\phi_1(x) \ldots \phi_N(x) \underline{0}(1,N)] \quad (35)$$

Figure 18:
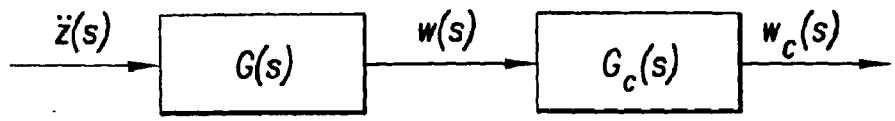
FIG. 18 is a block diagram of the feedforward control scheme used for the accelerometer design.

In this equation, matrix D is a N×N matrix of damping coefficients which are determined experimentally. Commonly, the accelerometer frequency range (the region where the response can be approximated by a flat horizontal line) is about 20% of the fundamental frequency. One way to increase the accelerometer range is thus to increase the beam's fundamental frequency which has the drawback of lowering the sensitivity especially at low frequencies. In order to increase the frequency range of the accelerometer, without reducing the sensitivity, a feedforward control scheme may be used. This control scheme is shown in FIG. 18, where G(s) and $G_c(s)$ is chosen to be a lead-lag compensator with two complex zeros located at the complex poles corresponding to the fundamental resonance frequency, thus performing pole-zero cancellation. The compensator poles are chosen to have a corner frequency approximately 50 times higher than that of the compensator zeros. Since an open-loop scheme is being considered, this scheme does not suppress the beam response at a fundamental resonance frequency but conditions the accelerometer output signal.

Figure 17A:
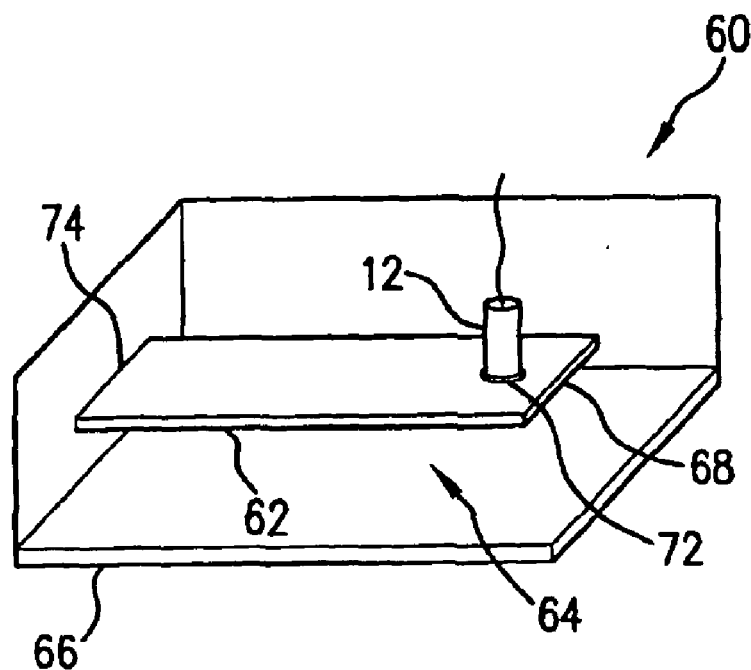
FIG. 17A is a schematic of the internal design of the fiber tip accelerometer.
Figure 17B:
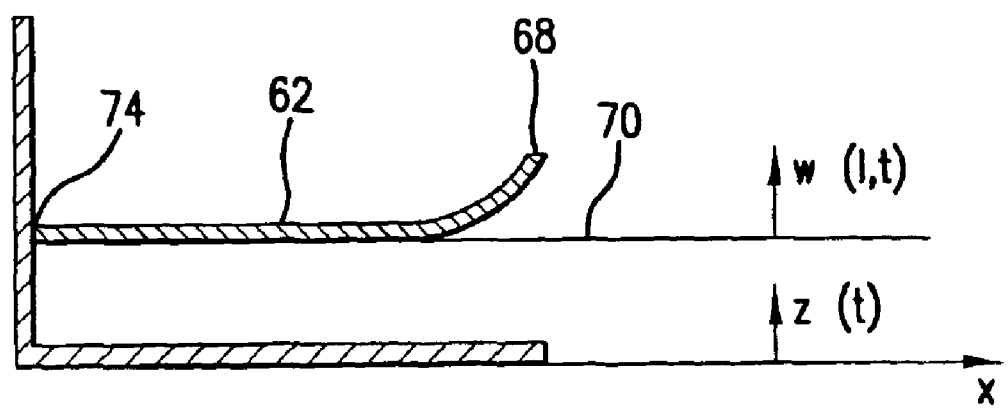
FIG. 17B is a schematic representation of the deflected beam of the fiber tip accelerometer.

The accelerometer prototype has been built which includes a housing 64, formed of DELRIN, and a cantilever beam 62 made of steel as shown in FIG. 17A. Beam dimensions were 7.7 mm×3.0 mm×0.03 mm. For the beam 62, the first three resonance frequencies were predicted to be 4179 Hz, 26,260 Hz, and 73,333 Hz, respectively.

The external dimensions of the prototype were 20.0 mm×8.0 mm×6.0 mm and the overall weight is approximately 1.01 grams. In order to measure the damping coefficients experimentally, the beam 62 was excited with a white noise signal by using a shaker and the frequency response was constructed by using a non-contact displacement sensor and a Signal Analyzer. The experimentally determined fundamental frequency occurs at 2930.0 Hz with the associated damping factor being 3.28e-3. It is believed that the beam properties as well as the boundaries are responsible for this difference between the predicted and measured values of the fundamental frequency. The second and third resonance frequency could not be experimentally measured due to experimental limitations. Damping factors of 0.001 were assumed for the second and third modes.

The simulation results for the accelerometer 60 are presented infra. As discussed in the context of Eq. (34), the second resonance frequency is more than six times the fundamental frequency, while the third resonance frequency is more than seventeen times the fundamental frequency. Although this might imply that a one mode approximation is sufficient for the analysis in the low frequency range, in the simulations, the first three modes were considered. The location of the fiber tip was chosen to be 6.0 mm from the end 74 in FIG. 17A, which is close to the nodal point of the second mode (nodal point is at a distance 6.03 mm from the fixed end 74). This was done to minimize the effect of the second mode on the measurements. For the accelerometer's beam size of 7.7 mm×3.0 mm×0.03 mm, the numerical values of the system matrices are as follows:

$$M = \begin{bmatrix} 1 & 0 & 0 \\ 0 & 1 & 0 \\ 0 & 0 & 1 \end{bmatrix}, K = \begin{bmatrix} 6.895e8 & 0 & 0 \\ 0 & 2.708e10 & 0 \\ 0 & 0 & 2.123e11 \end{bmatrix},$$

$$D = 2\sqrt{M^{-1}K} \begin{bmatrix} 3.28e-3 & 0 & 0 \\ 0 & 0.001 & 0 \\ 0 & 0 & 0.001 \end{bmatrix}, W = \begin{bmatrix} 0.005765 \\ 0.003195 \\ 0.001873 \end{bmatrix}$$

$$C = [-189.39 \; -4.76676 \; 131.724] \quad (36)$$

Figure 19A:
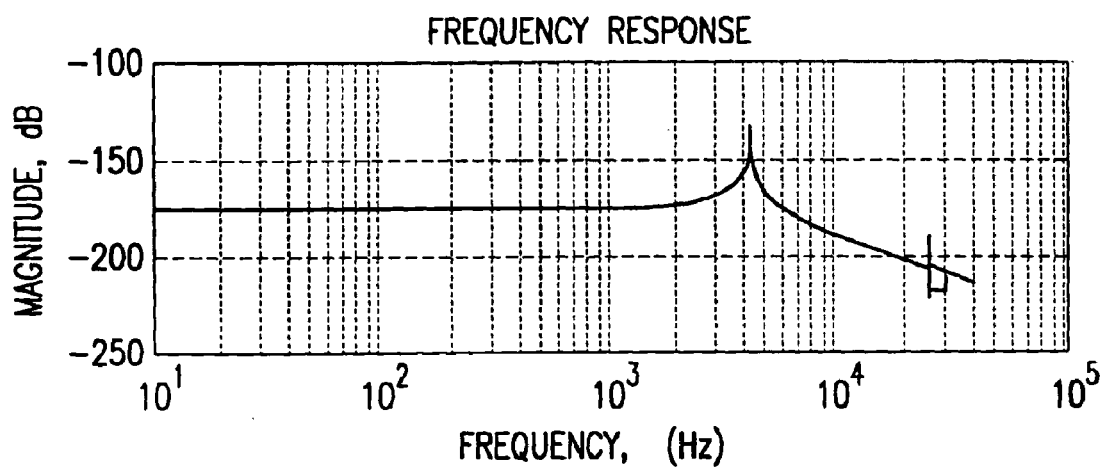
FIGS. 19A and 19B are diagrams showing, respectively, frequency response and pole zero map for accelerometer model predictions.
Figure 19B:
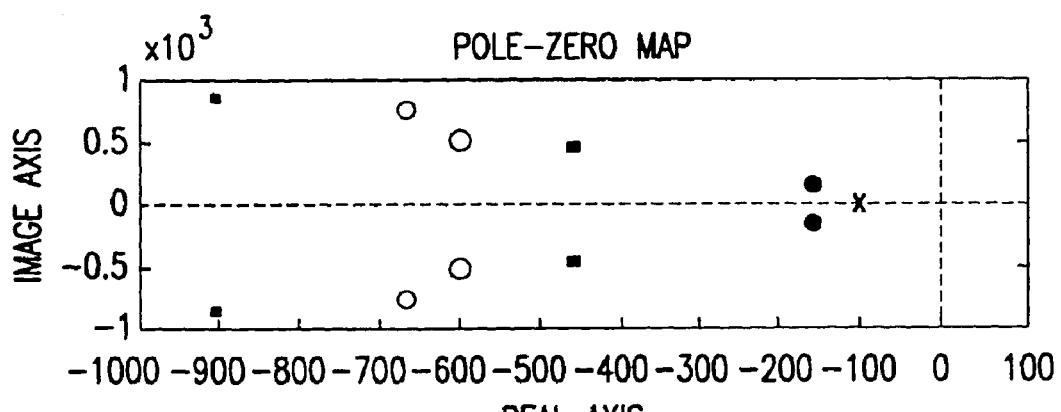
Figure 20A:
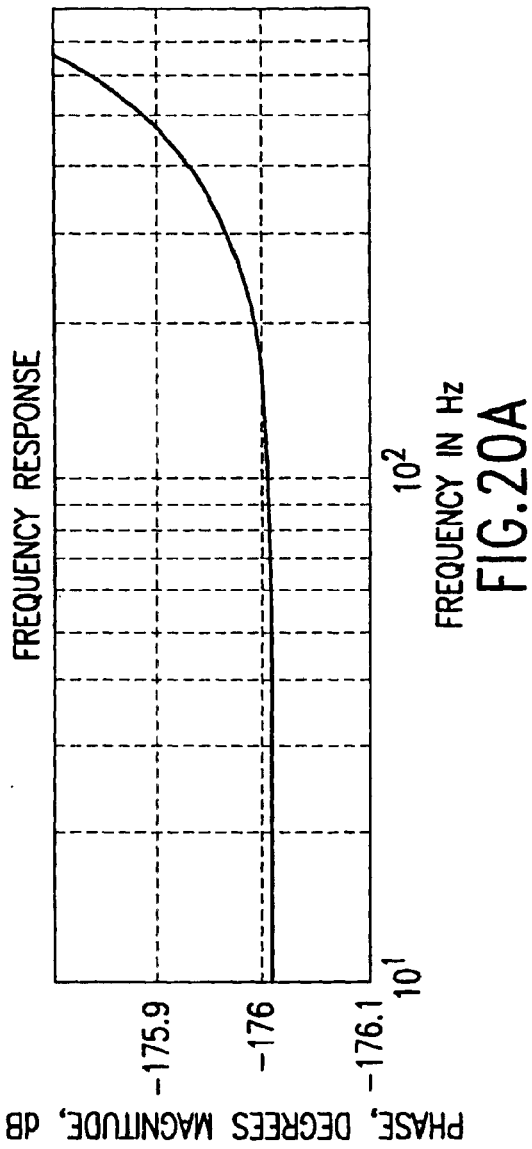
FIGS. 20A and 20B are diagrams showing frequency response of the uncontrolled accelerometer in a low frequency range.
Figure 20B:
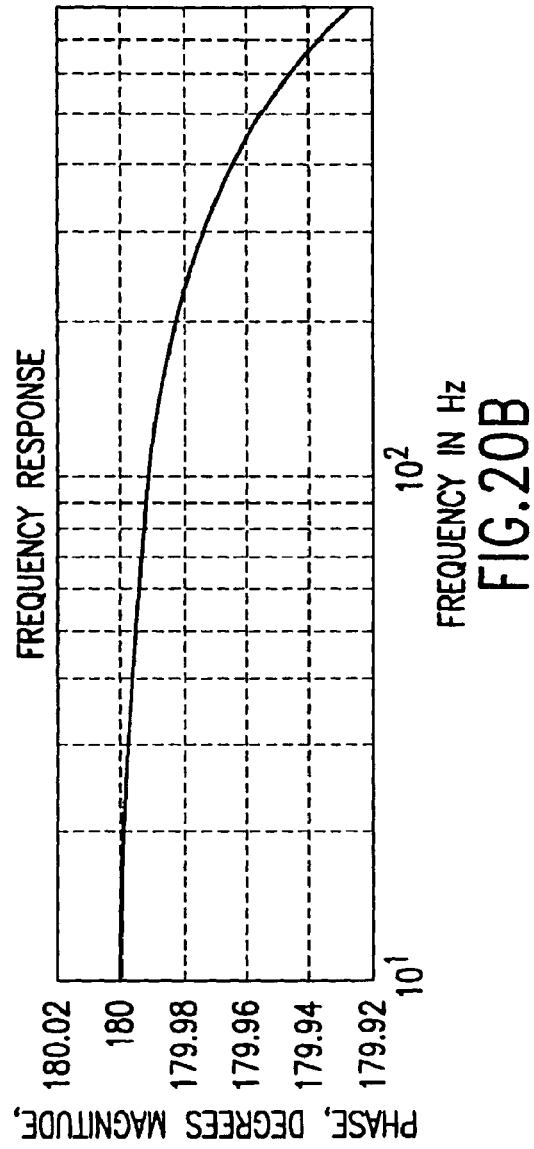

The second entry in the output maxtrix C is not identically zero, since the measuring point is not exactly at the nodal point. However, compared to the other, entries, the second modes contributes less than 4% to the output signal. Frequency response of the uncontrolled system is shown in FIG. 19A, while the pole-zero map is shown in FIG. 19B. It is evident from both graphs that the location of the fiber tip suffices for a near-pole-zero cancellation at the poles corresponding to the second mode. The flat region represents the frequency range where the accelerometer sensitivity is constant. This is basically the region in which the accelerometer is useful. FIGS. 20A–20B show the frequency response at low frequency range. An increase of 0.1 dB in magnitude occurs at the vicinity of 470.0 Hz. This increase is roughly equivalent to +1.0% increase in the accelerometer sensitivity. The corresponding phase change at that point is less than −0.04 degrees indicating that the magnitude change is the critical one in this particular case.

Figure 21A:
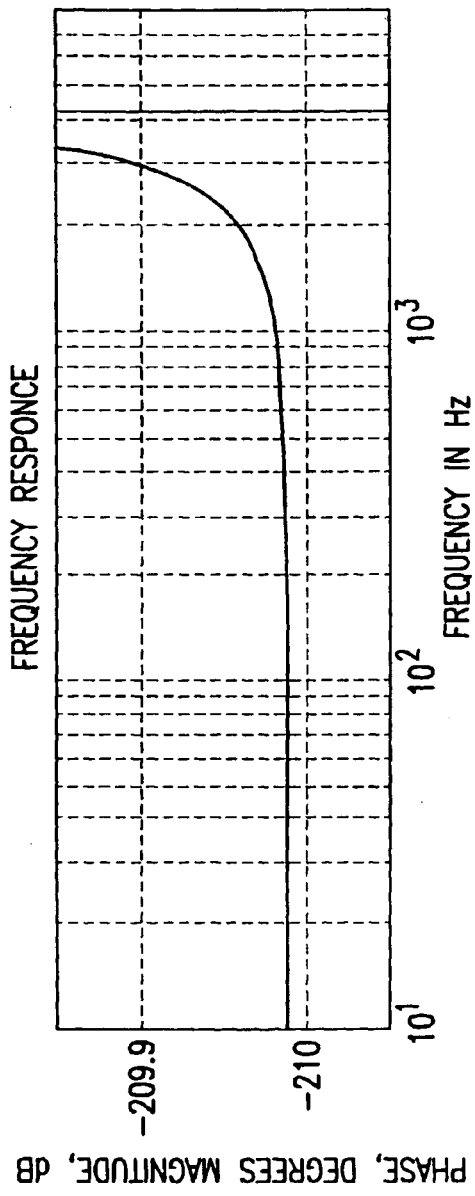
FIGS. 21A and 21B are diagrams showing frequency response of the controlled accelerometer in a low frequency range.
Figure 21B:
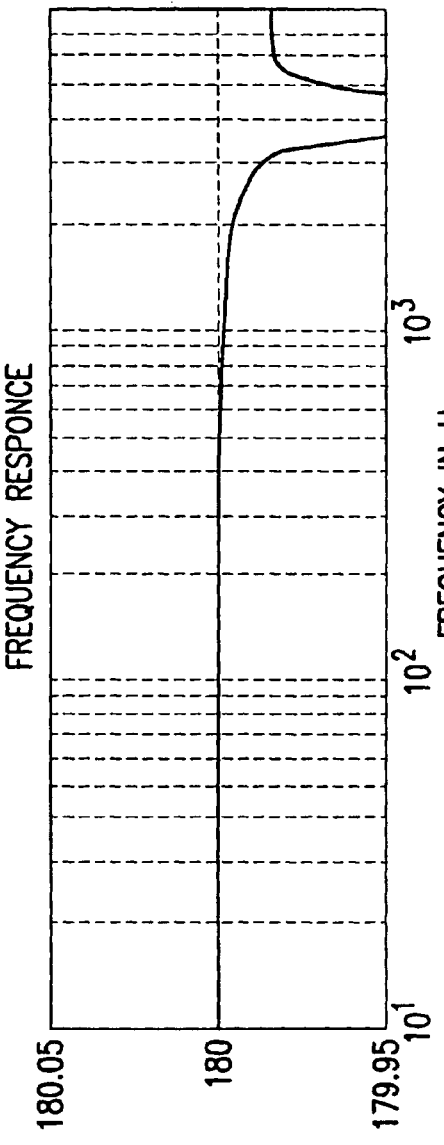
Figure 22A:
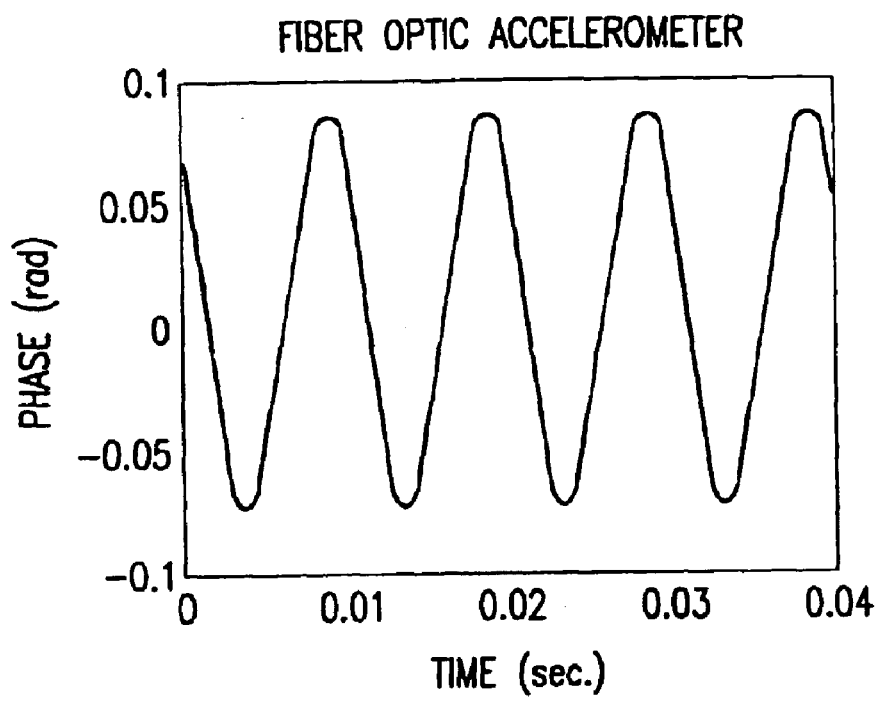
FIGS. 22A–22D are diagrams showing results of studies performed at 100 Hz comparing fiber optic accelerometer (FIGS. 22A and 22B) vs. Dytran accelerometer (FIGS. 22C and 22D)
Figure 22B:
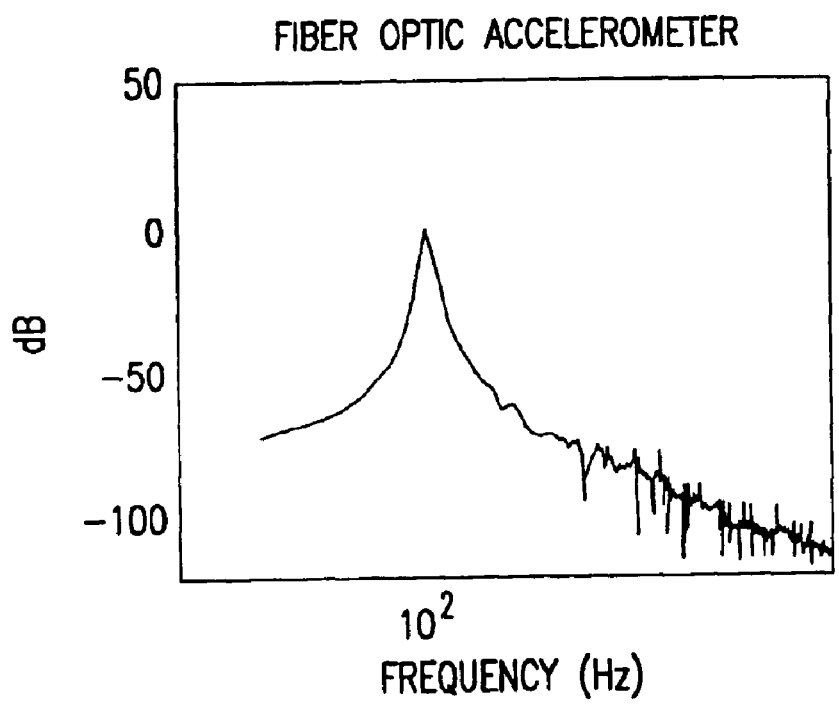
Figure 22C:
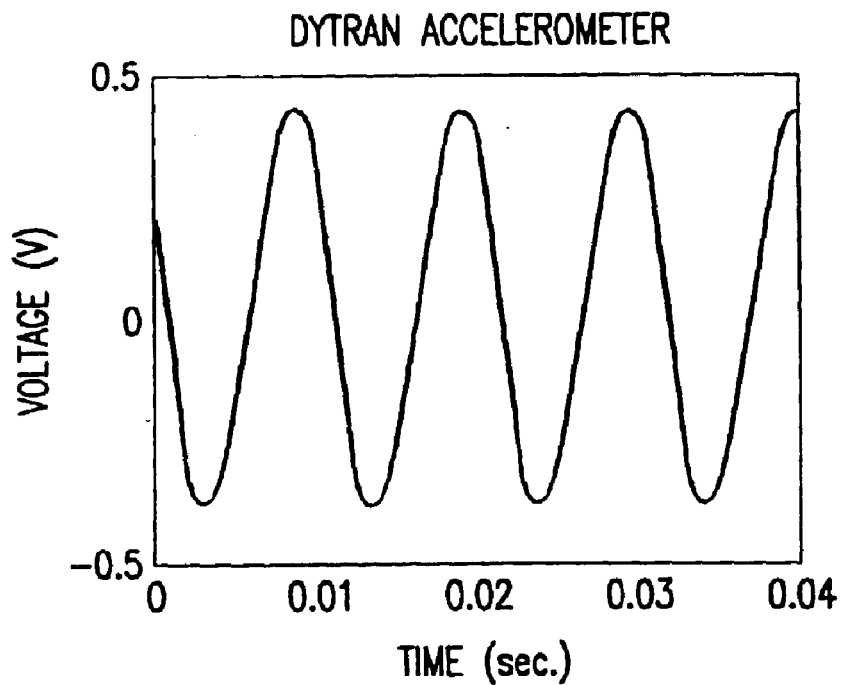
Figure 22D:
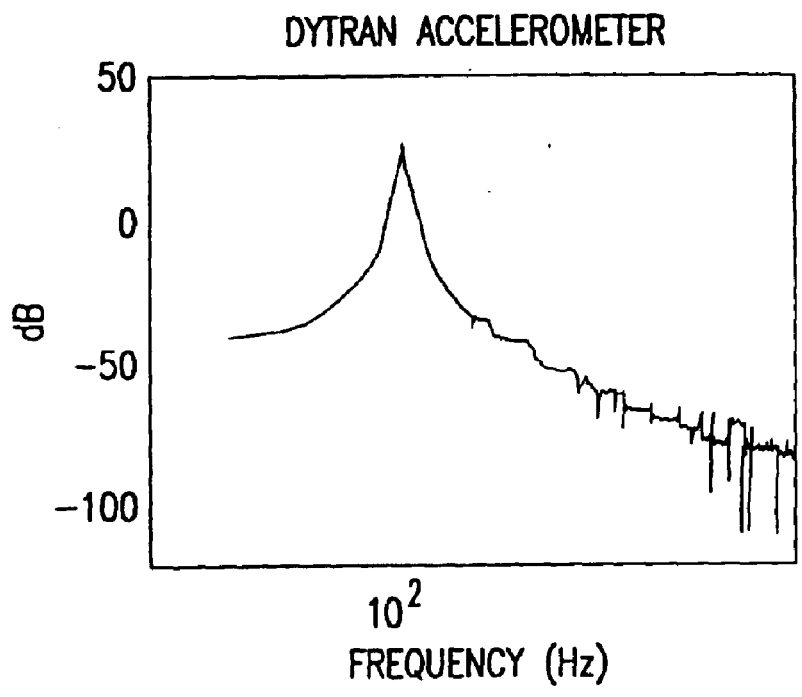
Figure 23A:
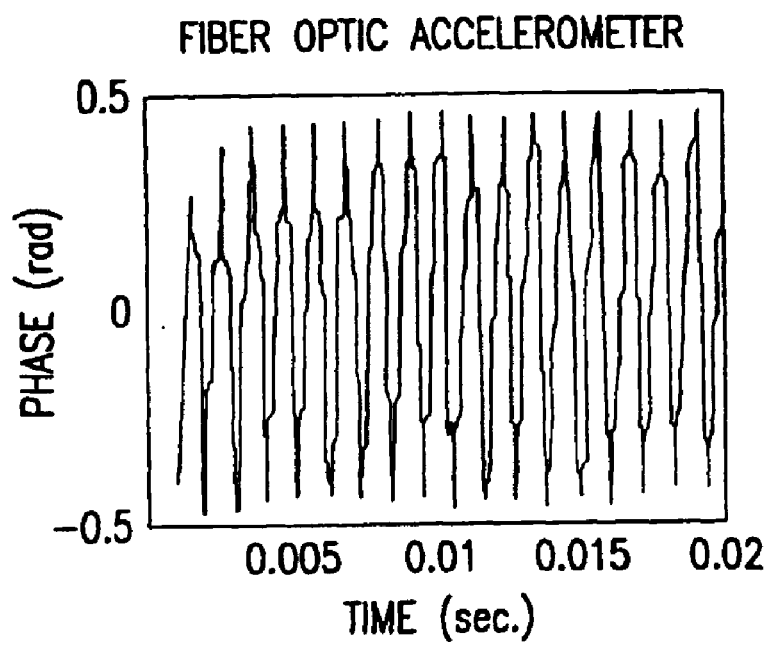
FIGS. 23A–23D show results of studies performed at 600 Hz comparing fiber-optic accelerometer (FIGS. 23A and 23B) vs. Dytran accelerometer (FIGS. 23C and 23D)
Figure 23B:
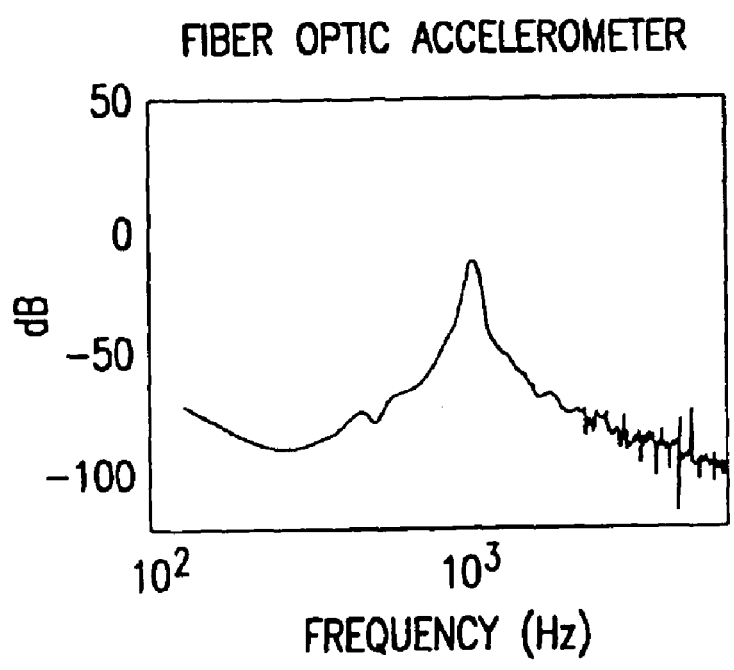
Figure 23C:
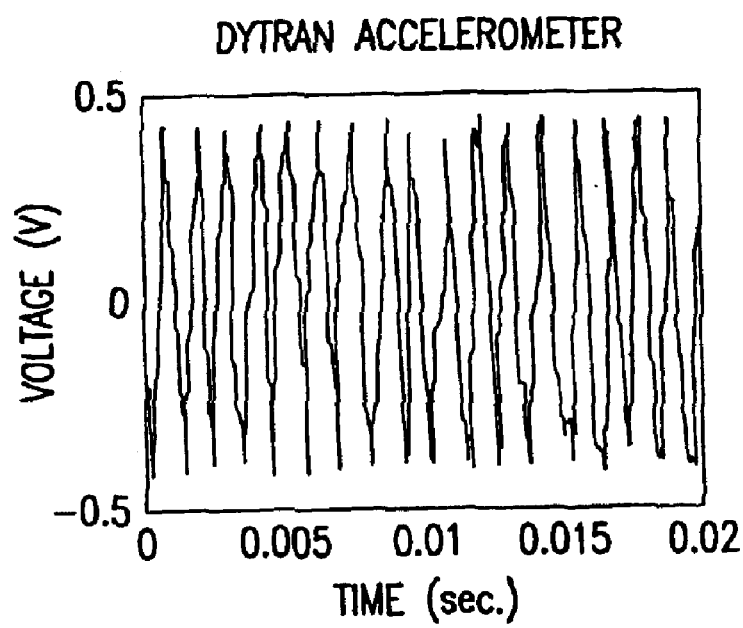
Figure 23D:
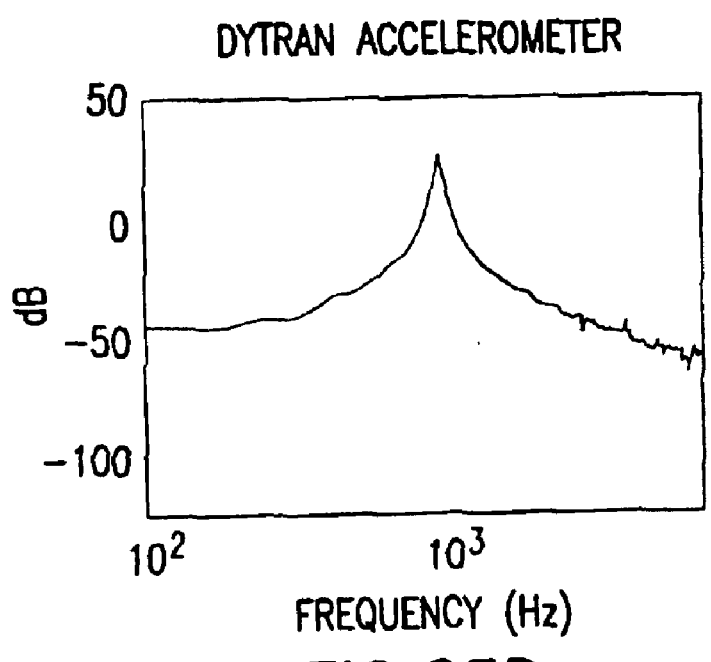

FIGS. 21A–21B show the frequency response results for the controlled accelerometer. To generate this graph, 0.5% mismatch was assumed in the locations of the controller zeros relative to the poles of the fundamental frequency. Even with this mismatch error, the accelerometer range may increase up to 3.0 kHz with the error in sensitivity being less than 1% and the error in phase being less than 0.015 degrees.

The fiber-optic accelerometer 60 was compared with a Dytran piezo accelerometer model number 3101AG. Both accelerometers were set on a vibrating circular plate supported on a cylindrical enclosure and excited by a piezoceramic patch driven by sinusoidal signals. Signals sensed by both accelerometers were not pure sinusoids due to the dynamics of the plate and enclosure. Representative results from studies performed at 100.0 Hz and 600.0 kHz are shown in FIGS. 22A–22D and 23A–23D respectively. The optical accelerometer data compares well with the Dytran piezo accelerometer in both time domain and frequency domain at low frequencies.

Figure 24:
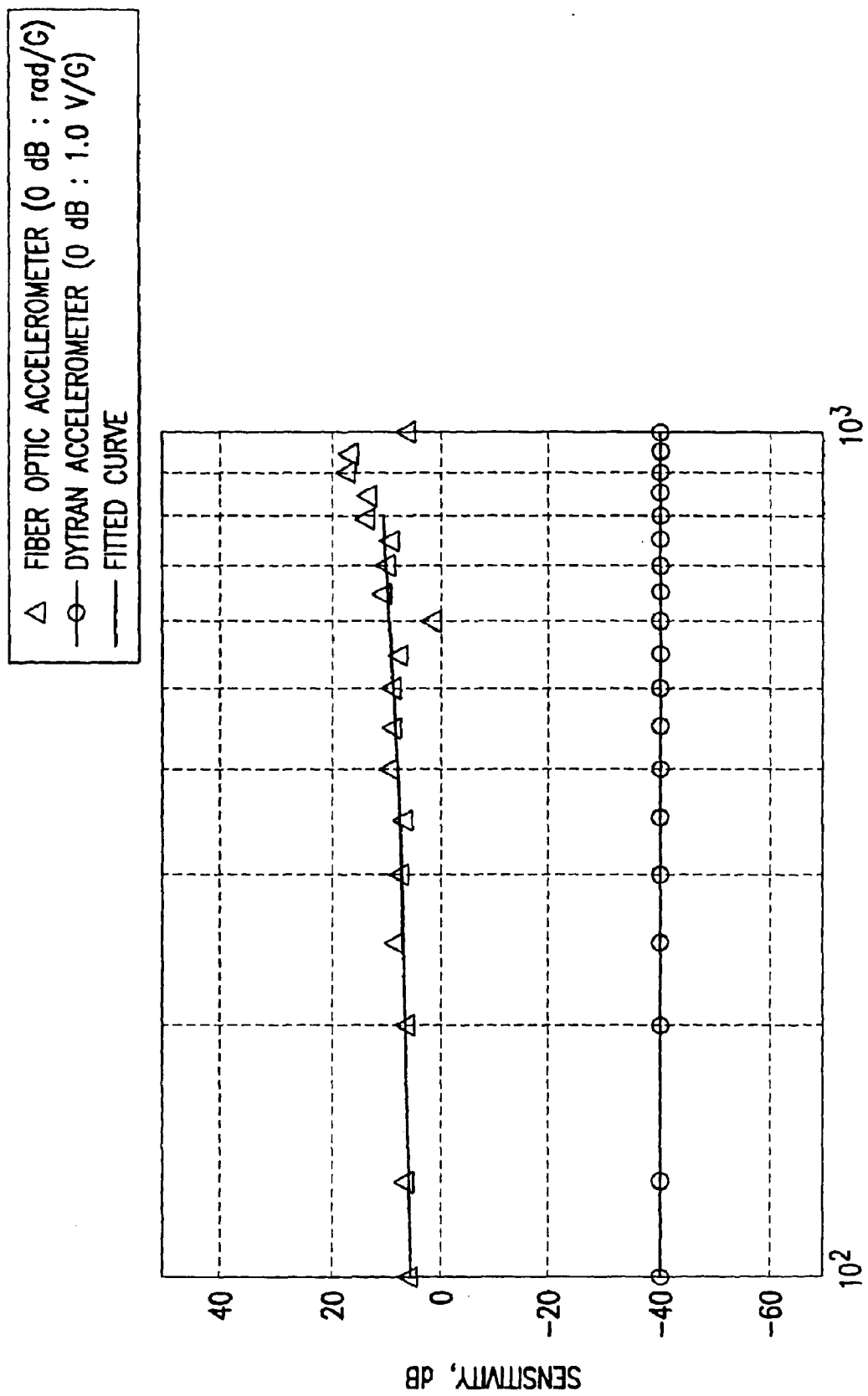
FIG. 24 is a diagram showing sensitivity vs. frequency response curve for the fiber based accelerometer compared with the Dytran 3101AG piezo accelerometer.

The sensitivity-frequency response curve is shown in FIG. 24. Up to 400.0 Hz, it has been determined that the sensitivity of FTFP accelerometer is +6.5±1.0 dB (0 dB indicates 1.0 rad/Pa). This is higher than the sensitivity of the Dytran piezo accelerometer (−40.35 dB, 0 dB indicates 1.0 V/G). The results obtained at low frequency are demonstrative of the applicability of the FTFP accelerometer for acoustic measurements.

Figure 25:
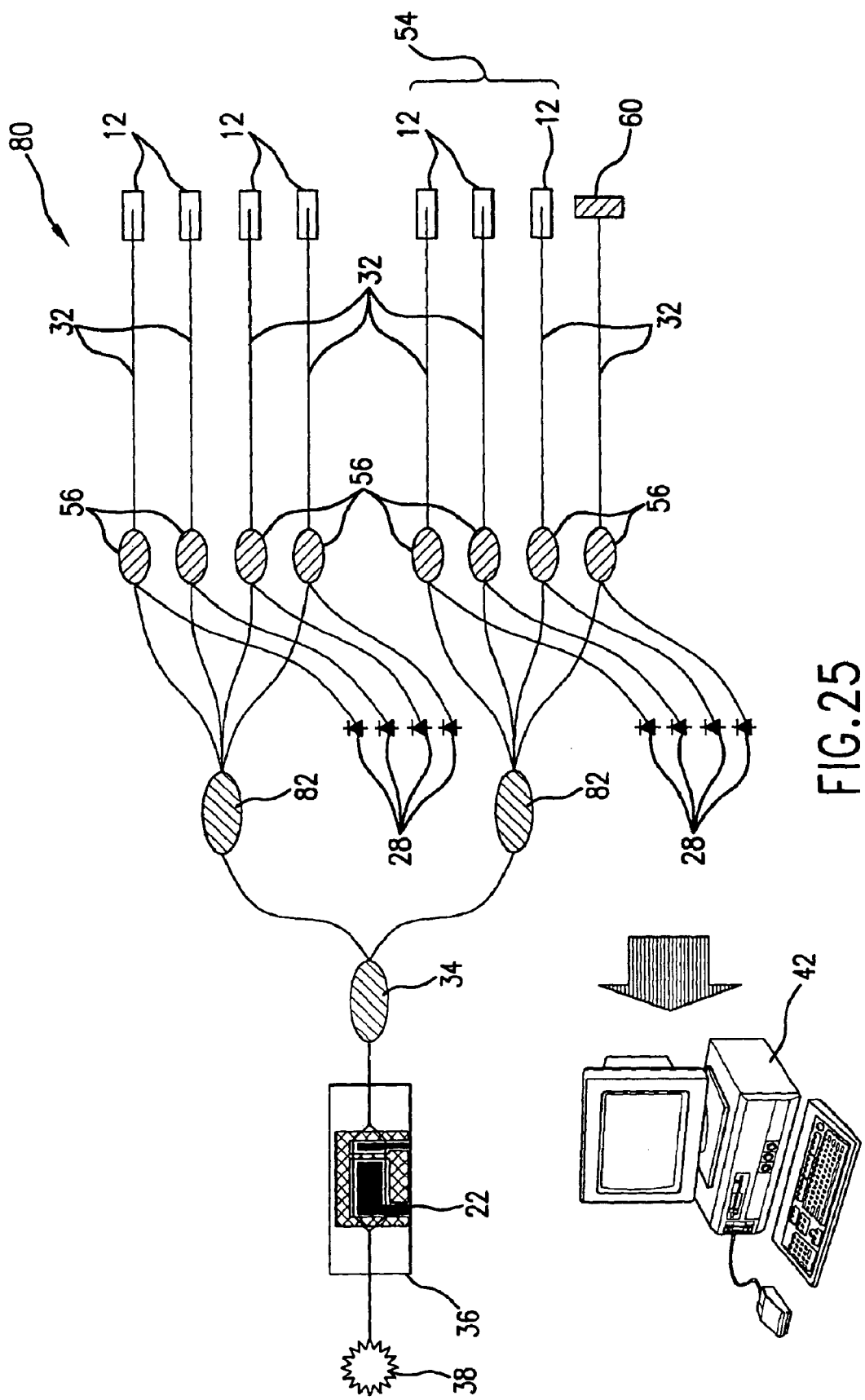
FIG. 25 shows a tree topology sensor network performing functions of microphone, velocity sensor, and accelerometer.

Referring to FIG. 25, the overall sensor system 80 was designed to work in a tree topology network. The system 80 includes the SLD source 38, the integrated optical circuit phase modulator 36, a 1×2 optical coupler 34, two 1×4 couplers 82, another set of eight 1×2 optical couplers 56 (similar to FIG. 15), seven FTFP sensors 12, the FTFP accelerometer 60, eight photodetectors 28, and a personal computer based data acquisition system 42. The tree topology network of FIG. 25 provides for spatial division multiplexing (SDM) and uses a large number of sensors 12 which are detected by using the same base optical system (i.e., light source and modulator). The demodulation system implemented for the sensor system design shown in FIG. 25, is a PC-based pseudo-heterodyne scheme based on a multi-step phase-stepping algorithm described supra herein. In this scheme, the optical signal is modulated by the IOC phase modulator 36 instead of a traditional PZT modulator.

In summary, a fiber optic sensor system has been developed for acoustic measurements over a 6 kHz bandwidth. The design of the sensor system of the present invention permits multiplexity on the input side of the system which is an important feature of the system of the present invention. This feature allows the design of an air particle velocity sensor that can be the basis for acoustic and density measurements. Additionally, the sensing system of the present invention may be used as a pressure sensor (microphone).

The subject novel optical system design is based on low coherence fiber-optic interferometry techniques which has a sensor interferometer (Fabry-Perot interferometer, the cavity of which is formed between the tip of the fiber and the studied object) and a read-out interferometer (which is a Mach-Zehnder interferometer) built in the integrated optical circuit phase modulator. This permits a high dynamic range and makes the system less sensitive to the wavelength fluctuation of the light source and the optical intensity fluctuations. Furthermore, the use of this interferometry technique makes it possible to realize phase modulation for sensors with "small" cavity lengths which is important for "small" scale sensors.

In the sensor's fabrication a diaphragm with tension is used as the transducer which makes it possible to realize high sensor bandwidth and high sensitivity simultaneously. A high reliability fiber connector is used and modified to be the sensor housing in order that the durability and accuracy of the sensor is improved. The fiber tip is coated with $TiO_2$ film which serves as a partial mirror of a Fabry-Perot cavity. Through this fabrication, the reflectivity of the fiber tip is increased from 4% to about 30%. The visibility in the signal-to-noise ratio of the sensor signal is greatly improved.

A novel digital phase modulation and demodulation scheme is developed by taking advantage of an integrated optical circuit (IOC) phase modulator and further by using the multi-step phase-stepping algorithm. This scheme permits high frequency real time phase signal demodulation without using any demodulation hardware, active control elements, or multiple interferometers that are necessary for existing demodulation techniques.

In addition, the sensor design based on a fiber tip sensor also permits the design of accelerometers. Compared to conventional condensor microphone sensors, the fiber optic sensors are immune to electromagnetic interference, have high sensitivity, small in size, and they may also be multiplexed. The prior art systems used for acoustic intensity measurements are bulky in size and cannot be reduced to the spatial scales obtained with the subject fiber tip based fiber optic sensor system.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of the elements may be reversed or interposed, all without departing from the spirit or scope of the invention as defined in the appended Claims.

What is claimed is:

1. A fiber optic sensor system for acoustic measurements, comprising:

at least one sensor, said at least one sensor including a diaphragm and a sensing fiber-tip based interferometer having a Fabry-Perot cavity formed between said fiber tip and said diaphragm, said fiber tip and said diaphragm both being optically reflective to form a pair of reflective surfaces of said interferometer;

an Integrated Optical Circuit phase modulator coupled to said at least one sensor, a read-out interferometer built in said Integrated Optical Circuit phase modulator, said read-out interferometer being path-matched to said sensing interferometer, a source of light generating a light beam coupled to said Integrated Optical Circuit phase modulator for being modulated therein, the modulated light being coupled to said at least one sensor, at least one photo-detector coupled to an output of said at least one sensor and to said Integrated Optical Circuit phase modulator, and processing means for calculating the phase signal of said at least one sensor, said processing means including phase modulating means and phase demodulating means, said phase modulating means being coupled to said Integrated Optical Circuit phase modulator to define a phase modulation pattern thereof, and said phase demodulating means being coupled to an output of said at least one photodetector to decode the optical intensity of the signal output therefrom.

2. The fiber optic sensor system of claim 1, further comprising a plurality of substantially identical said sensors at an input side of said fiber optic sensor system, and an optical switch coupled to said plurality of said sensors for multiplexing said input side of said fiber optic sensor system.

3. The fiber optic sensor system of claim 1, wherein said phase modulation and phase demodulation means includes a pseudo-heterodyne scheme based on a multi-step phase-stepping.

4. The fiber optic sensor system of claim 3, wherein said phase modulation means includes a discrete saw tooth wave modulation signal generated by said processing means at a digital-to-analog output thereof, said modulation signal being coupled to said Integrated Optical Circuit phase modulator to generate four step modulated phase values at the output of said IOC phase modulator during each period of said modulation signal, said four step modulated phase values being coupled to said at least one photodetector and to said at least one sensor.

5. The fiber optic sensor system of claim 4, wherein said phase demodulation means samples the optical intensity at the output of said at least one photodetector four times during each period of said modulation signal.

6. The fiber optic sensor system of claim 5, wherein said phase demodulation means synchronize sampling rate and the modulation frequency, and once the depth of modulation reaches $3\pi/2$, said phase demodulation means measure optical intensities $I_0$, $I_1$, $I_2$, and $I_3$ at the output of said at least one photodetector, and wherein said processing means calculate a sensor phase $_\Delta\phi$, based on said measured intensity values as $$\Delta\phi_s = \tan^{-1}\left(\frac{I_3 - I_1}{I_0 + I_2}\right).$$

7. The fiber optic sensor system of claim 1, further including at least one optical coupler, connected between said IOC modulator and said at least one sensor.

8. The fiber optic sensor system of claim 1, wherein said processing means further calculate acoustic pressure.

9. The fiber optic sensor system of claim 1, further comprising at least one pair of substantially identical said sensors, said pair of said sensors being aligned at a single axis.

10. The fiber optic sensor system of claim 9, wherein said processing means further calculate air particles velocity.

11. The fiber optic sensor system of claim 1, further including a deflectable cantilever beam, said at least one sensor being coupled to said cantilever beam at a predetermined point thereof to measure deflection of said cantilever beam under excitation, said processing means calculating the excitation acceleration based on said measured deflection.

12. The fiber optic sensor system of claim 1, further includes a $TiO_2$ fiber coating on said fiber tip.

13. The fiber optic sensor system of claim 1, further comprising an array of said sensors, an array of said photodetectors and a plurality of optical couplers coupling each of said sensors to a respective one of said photodetectors.

14. The fiber optic sensor system of claim 1, wherein said processing means calculate acoustic pressure based on the optical phase change of the sensor output signal.

15. The fiber optic sensor system of claim 1, wherein said diaphragm is made of Mylar film.

16. The fiber optic sensor system of claim 1, wherein said at least one sensor includes a high reliability connector ferrule, the fiber passing longitudinally through said connector ferrule.

17. The fiber optic sensor system of claim 1, wherein the distance between said fiber tip and said diaphragm is of an adjustable value.

18. The fiber optic sensor system of claim 1, wherein the distance between said fiber tip and said diaphragm is approximately 60 µm.

19. The fiber optic sensor system of claim 1, wherein the said diaphragm has a thickness of approximately 40 µm and a radius of approximately 2.5 mm.

20. A fiber optic sensor system for acoustic measurements, comprising:

a pressure sensor, and a velocity sensor, said pressure sensor and said velocity sensor comprising a plurality of substantially identical sensors, each sensor including a diaphragm and a fiber tip based sensing interferometer having a Fabry-Perot cavity formed between said fiber tip and said diaphragm, said fiber tip and said diaphragm both being optically reflective to form a pair of reflective surfaces of said interferometer.

21. The fiber optic sensor system of claim 20, further comprising:

an accelerometer, said accelerometer including a cantilever beam deflectable under excitation and a one of said plurality of the sensors coupled to said cantilever beam at a predetermined point thereof.

22. The fiber optic sensor system of claim 20, further comprising:

a light source, an Integrated Optical Circuit (IOC) phase modulator coupled to said light source to modulate the light generated from said light source, a read-out interferometer built in said IOC phase modulator, said read-out interferometer being path-matched to said sensing interferometer of each of said plurality of the sensors, a plurality of photodetectors, each photodetector being coupled to a respective one of said plurality of the sensors, phase modulation-demodulation means coupled to said IOC phase modulator and said plurality of the photodetectors for modulating said light beam in said IOC phase modulator in accordance with a multi-step phase-stepping pattern, and for demodulating data obtained from said plurality of the photodetectors in synchronism with said multi-step phase-stepping pattern, and processing means coupled to said phase modulation-demodulation means for controlling said multi-step phase-stepping pattern and for calculating phase signals of said sensors based on said obtained data.

23. The fiber optic sensor system of claim 20, further comprising an optical switch coupled between said IOC phase modulator and said plurality of the sensors for multiplexing an input side of said fiber optic sensor system.

24. The fiber optic sensor system of claim 20, wherein said velocity sensor includes a plurality of pairs of said sensors, each pair being aligned at a single axis and angled with respect to an axis of another pair of said sensors.

* * * * *